(12) United States Patent
Utsumi et al.

(10) Patent No.: US 10,478,005 B2
(45) Date of Patent: Nov. 19, 2019

(54) STEAM GENERATING APPARATUS AND HEATING COOKER

(71) Applicant: Sharp Kabushiki Kaisha, Sakai-shi, Osaka (JP)

(72) Inventors: Takashi Utsumi, Sakai (JP); Keiko Fukuoka, Sakai (JP); Yuko Nakajima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 93 days.

(21) Appl. No.: 15/122,653

(22) PCT Filed: Aug. 24, 2015

(86) PCT No.: PCT/JP2015/073671
§ 371 (c)(1),
(2) Date: Aug. 31, 2016

(87) PCT Pub. No.: WO2016/035592
PCT Pub. Date: Mar. 10, 2016

(65) Prior Publication Data
US 2017/0164778 A1    Jun. 15, 2017

(30) Foreign Application Priority Data

Sep. 5, 2014 (JP) ................................. 2014-181110
Sep. 5, 2014 (JP) ................................. 2014-181542

(51) Int. Cl.
*F24C 1/00* (2006.01)
*F24C 15/16* (2006.01)
(Continued)

(52) U.S. Cl.
CPC ............... *A47J 27/04* (2013.01); *A21B 3/04* (2013.01); *F22B 1/285* (2013.01); *F22D 5/26* (2013.01);
(Continued)

(58) Field of Classification Search
None
See application file for complete search history.

(56) References Cited

U.S. PATENT DOCUMENTS

2005/0051530 A1*  3/2005  Shozo ............... A21B 3/04
                                                    219/401
2005/0051531 A1*  3/2005  Shozo ............... A21B 3/04
                                                    219/401
(Continued)

FOREIGN PATENT DOCUMENTS

EP        1956299 A1 *  8/2008  ............ A21B 3/04
JP        59-185502 U    12/1984
(Continued)

OTHER PUBLICATIONS

JP 1984-185502 U1, Dec. 1984, Hitachi, partial translation. (Year: 1984).*

(Continued)

*Primary Examiner* — Joseph M Pelham
(74) *Attorney, Agent, or Firm* — ScienBiziP, P.C.

(57) ABSTRACT

A steam generating apparatus includes: a steam generator including a housing capable of storing water therein, and a heating unit for heating the housing so as to generate steam; a water level measurement unit for measuring a water level in the housing; and a water supply unit for supplying water into the housing. A controller controls, when a time during which the measured water level does not exceed the threshold value continues for a first time, the water supply unit to start water supply into the housing, and controls, when the time during which the measured water level does not exceed the threshold value continues for a second time longer than the first time, the heating unit to stop heating of the housing.

6 Claims, 17 Drawing Sheets

(51) Int. Cl.
    *A21B 1/24*     (2006.01)
    *A21B 3/04*     (2006.01)
    *A47J 27/04*    (2006.01)
    *F22B 1/28*     (2006.01)
    *F22D 5/26*     (2006.01)
    *F24C 15/32*    (2006.01)

(52) U.S. Cl.
    CPC .............. *F24C 15/327* (2013.01); *A21B 1/24* (2013.01); *A47J 2027/043* (2013.01); *A47J 2203/00* (2013.01)

(56) References Cited

U.S. PATENT DOCUMENTS

2008/0236623 A1* 10/2008 Kim ................... A47L 15/0002
                                                     134/18
2009/0038481 A1*  2/2009 Yamamoto ............... A21B 3/04
                                                     99/330

FOREIGN PATENT DOCUMENTS

| JP | 11-063581 A   | 3/1999  |
| JP | 2002-317971 A | 10/2002 |
| JP | 2003-279083 A | 10/2003 |
| JP | 2004-176943 A | 6/2004  |
| JP | 2008-014516 A | 1/2008  |
| JP | 2008-032268 A | 2/2008  |
| JP | 2008-045788 A | 2/2008  |
| JP | 2009-036432 A | 2/2009  |
| JP | 2011-242103 A | 12/2011 |
| JP | 2013-124838 A | 6/2013  |
| JP | 2014-020705 A | 2/2014  |

OTHER PUBLICATIONS

JP 2008-032268 A, Feb. 2008, Sharp Corp . . . , partial translation. (Year: 2008).*

Official Communication issued in International Patent Application No. PCT/JP2015/073671, dated Nov. 17, 2015.

* cited by examiner

FIG.5
(A)
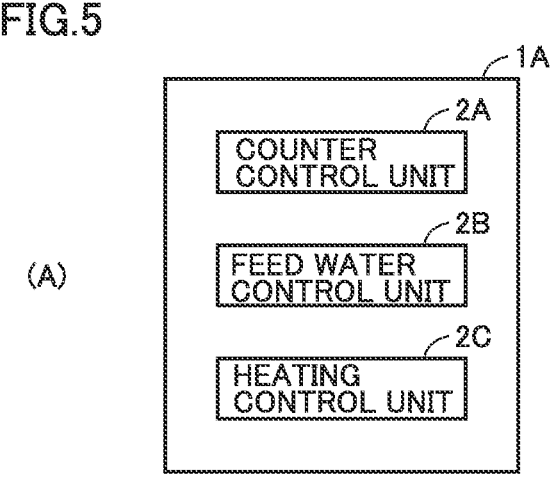
(B)
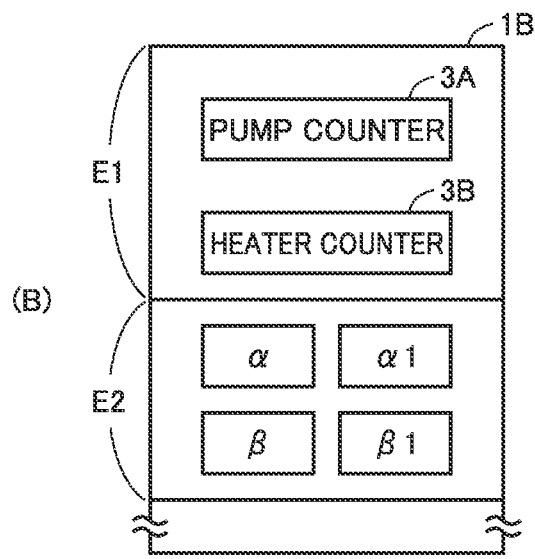

FIG.6
(A)
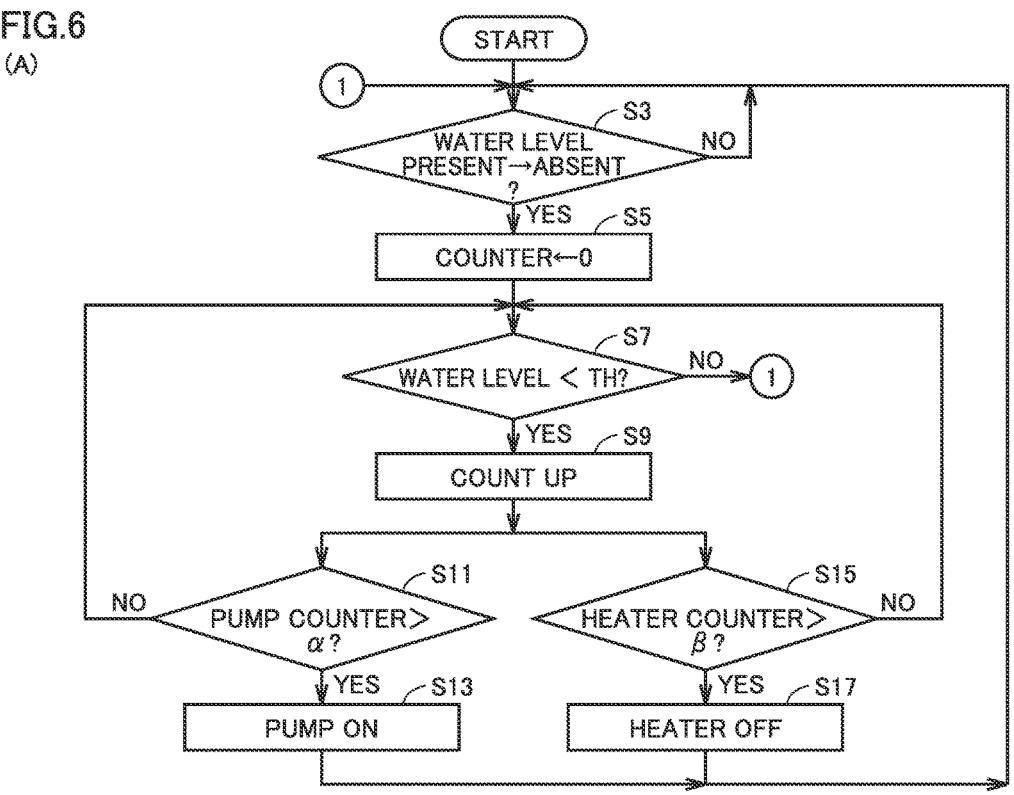
(B)
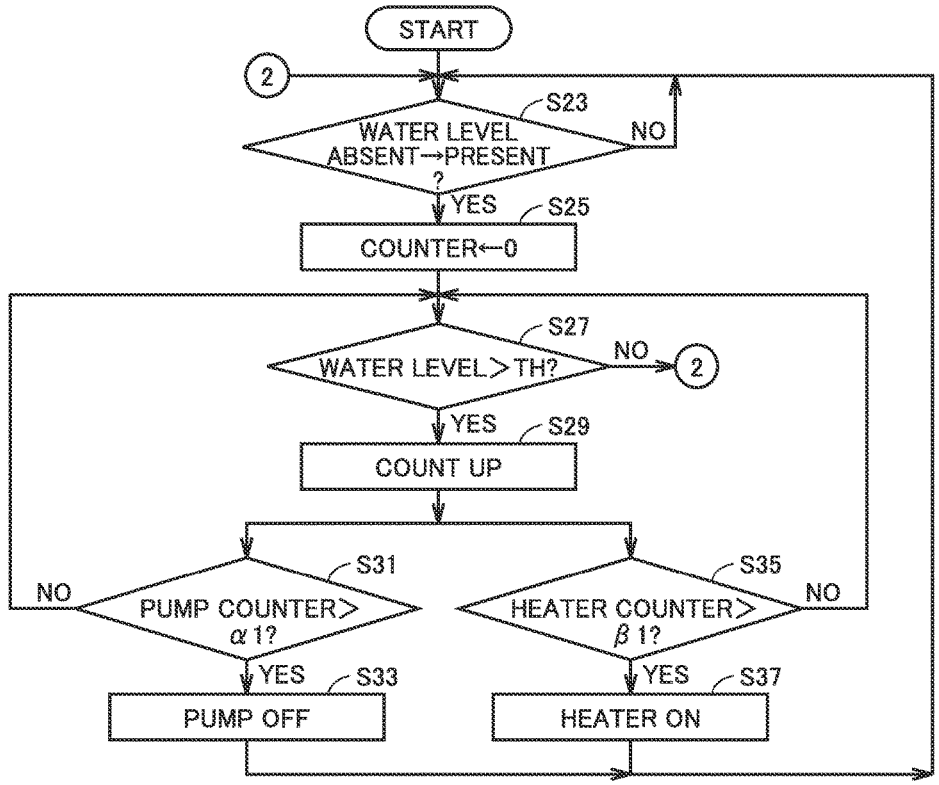

DURING NORMAL OPERATION

WHEN HEATING IS STOPPED DURING WATER FEED ABNORMALITY

FIG.17

| TB | | | | AR | |
|---|---|---|---|---|---|
| COOKING MODE | M1 INPUT TIME t (30 SECONDS AFTER START) | M2 IN CASE OF WATER-NOT-PRESENT ERROR DURING INITIAL WATER FEED | M3 IN CASE OF WATER-NOT-PRESENT ERROR DURING HEATING | | |
| | | | M31 | M32 | |
| STEAM | 0" ≤ t < 9'30" | IMMEDIATE ERROR STOP | IMMEDIATE ERROR STOP WITH 3 MINUTES OR MORE REMAINING | CONTINUE OPERATION WITH LESS THAN 3 MINUTES REMAINING | F |
| | 9'30" ≤ t < 19'30" | IMMEDIATE ERROR STOP | IMMEDIATE ERROR STOP WITH 4 MINUTES OR MORE REMAINING | CONTINUE OPERATION WITH LESS THAN 4 MINUTES REMAINING | F |
| | 19'30" ≤ t ≤ 29'30" | IMMEDIATE ERROR STOP | IMMEDIATE ERROR STOP WITH 5 MINUTES OR MORE REMAINING | CONTINUE OPERATION WITH LESS THAN 5 MINUTES REMAINING | F |
| SOFT STEAM | 0" ≤ t < 9'30" | IMMEDIATE ERROR STOP | IMMEDIATE ERROR STOP WITH 3 MINUTES OR MORE REMAINING | CONTINUE OPERATION WITH LESS THAN 3 MINUTES REMAINING | F |
| | 9'30" ≤ t < 19'30" | IMMEDIATE ERROR STOP | IMMEDIATE ERROR STOP WITH 4 MINUTES OR MORE REMAINING | CONTINUE OPERATION WITH LESS THAN 4 MINUTES REMAINING | F |
| | 19'30" ≤ t ≤ 44'30" | IMMEDIATE ERROR STOP | IMMEDIATE ERROR STOP WITH 5 MINUTES OR MORE REMAINING | CONTINUE OPERATION WITH LESS THAN 5 MINUTES REMAINING | F |
| FERMENT | 0" ≤ T1 < 7H59'30" | IMMEDIATE ERROR STOP | CONTINUE OPERATION | | F |
| WO | ~MAX | IMMEDIATE ERROR STOP | CONTINUE OPERATION | | F |
| SANITIZE | | | | | |
| CLEAN CHAMBER INSIDE | — | IMMEDIATE ERROR STOP | CONTINUE OPERATION | | F |
| CITRIC ACID CLEANING (CLEAN) | — | IMMEDIATE ERROR STOP DURING WATER INJECTION | IMMEDIATE ERROR STOP | | |
| CITRIC ACID CLEANING (RINSE) | — | IMMEDIATE ERROR STOP DURING WATER INJECTION | IMMEDIATE ERROR STOP | | |

STEAM GENERATING APPARATUS AND HEATING COOKER

TECHNICAL FIELD

The present invention relates to steam generating apparatuses and heating cookers, and more particularly to a steam generating apparatus and a heating cooker that allow cooking with steam.

BACKGROUND ART

PTD 1 (Japanese Patent Laying-Open No. 2004-176943) and PTD 2 (Japanese Patent Laying-Open No. 2013-124838) each disclose a heating device using steam. The heating device of PTD 1 controls water feed to a steam generator based on temperature information from a temperature detection unit provided on the steam generator. The heating device of PTD 2 feeds water in a feed water tank to a steam generating apparatus through a feed water pump, so as to generate steam.

CITATION LIST

Patent Documents

PTD 1: Japanese Patent Laying-Open No. 2004-176943
PTD 2: Japanese Patent Laying-Open No. 2013-124838

SUMMARY OF INVENTION

Technical Problem

In PTD 1, water is sensed based on the temperature detected at the steam generator. That is, in PTD 1, water sensing is performed by exploiting the fact that the detected temperature is constant in the presence of water and the detected temperature rises when the water is gone. In PTD 1, heating is stopped when the temperature detected at the steam generator has risen to a certain extent.

With the method using the detected temperature of PTD 1, however, although the presence or absence of water can be determined, it is difficult to detect a level of water present in the steam generator. As such, in PTD 1, when the heating is stopped based on the detected temperature, there is a possibility that the water in a container has already been evaporated completely to bring about a dry-up state. In this case, scale produced by the evaporation (mineral component, calcium carbonate and the like in tap water) tends to be deposited on an inner wall of the container. An increase in amount of scale deposition results in lower thermal efficiency.

In addition, excellent usability is desired by a user of a heating cooker that performs heat cooking with steam.

Thus, an object of the present disclosure is to provide a steam generating apparatus and a heating cooker capable of performing control of steam generation operation depending on the amount of water in a steam generator.

Another object of the present disclosure is to provide a heating cooker using steam and having excellent usability.

Solution to Problem

A steam generating apparatus according to one embodiment includes a steam generator. The steam generator includes a housing capable of storing water therein, and a heating unit for heating the housing so as to generate steam. The steam generating apparatus further includes a water level measurement unit for measuring a water level in the housing, a water supply unit for supplying water into the housing, and a controller for controlling the heating unit and the water supply unit. The controller includes a determination unit for determining whether or not the water level measured by the water level measurement unit exceeds a threshold value. The controller controls, when it is determined that the measured water level does not exceed the threshold value, and thereafter, when a time during which it is determined that the measured water level does not exceed the threshold value continues for a first time, the water supply unit to start water supply into the housing, and controls, when the time during which it is determined that the measured water level does not exceed the threshold value continues for a second time longer than the first time, the heating unit to stop heating of the housing.

Preferably, a length of the second time represents a length of time required for the level of water stored in the housing to vary from the threshold value to a predetermined residual water level by evaporation.

Preferably, the controller is further configured to, when it is determined that the measured water level exceeds the threshold value, and thereafter, when a time during which it is determined that the measured water level exceeds the threshold value continues for a third time, control the heating unit to start heating of the housing, and when the time during which it is determined that the measured water level exceeds the threshold value continues for a fourth time longer than the third time, control the water supply unit to stop the water supply into the housing.

Preferably, the steam generating apparatus further includes a temperature measurement unit for measuring temperature in the housing. The steam generating apparatus varies a length of time of the water supply by the water supply unit based on the temperature measured by the temperature measurement unit.

Preferably, the length of time of the water supply when the measured temperature is equal to or greater than a predetermined temperature is longer than the length of time of the water supply when the measured temperature is less than the predetermined temperature.

Preferably, the steam generating apparatus further includes a water tank for containing water therein. The water supply unit includes a pump for flowing water between the water tank and the inside of the housing.

The controller is configured to, when controlling the pump to continue supply operation of delivering the water in the water tank into the housing for a predetermined time since start of the water supply into the housing, or when controlling the pump to continue the supply operation for a predetermined time since stop of the heating by the heating unit, and when it is determined by the determination unit that the measured water level does not exceed the threshold value, determine that there is no water in the water tank.

Preferably, the controller controls the pump to deliver the water in the housing to the water tank.

Preferably, the water level measurement unit includes electrodes which can be immersed in the water in the housing. The water level measurement unit measures the water level in the housing by conduction between the electrodes.

In accordance with another embodiment, a heating cooker including the steam generating apparatus described above further includes an accommodation chamber for food. The heating cooker is configured to supply the steam from the steam generating apparatus into the accommodation chamber.

A heating cooker according to yet another embodiment includes an accommodation chamber for accommodating food therein, and a steam generator. The steam generator includes a housing capable of storing water therein, and a heating unit for heating the housing so as to generate steam. The heating cooker further includes a water discharge unit for discharging the water in the housing, and a controller for controlling the heating cooker. The controller is configured to, when steam cooking of supplying the steam from the steam generator into the accommodation chamber is executed, control the water discharge unit to start water discharge during the steam cooking.

Preferably, the controller is configured to, when the water discharge is started during the steam cooking and continued until termination of the cooking, control the water discharge unit to start the water discharge at timing when overheating of the accommodation chamber is avoided.

Preferably, the heating cooker further includes a water tank for containing water therein, and a flow path unit for flowing the water between the water tank and the inside of the housing. The controller controls, when a remaining time until termination of the steam cooking reaches a time required to discharge an amount of stored water in the housing and an amount of residual water in the flow path portion, the water discharge unit to start discharge of the water in the housing into the water tank through the flow path unit.

Preferably, the water discharge unit is provided on the flow path unit. The water discharge unit includes a pump for flowing the water between the water tank and the inside of the housing. The controller controls, when the remaining time until termination of the steam cooking reaches the required time, the pump to deliver the water in the housing into the water tank.

Preferably, the controller controls the pump to deliver the water in the water tank into the housing through the flow path unit.

BRIEF DESCRIPTION OF DRAWINGS

FIG. 5 is a diagram illustrating a functional configuration and stored contents according to the first embodiment.

FIG. 6 is a process flowchart related to control of water feed to a steam generating apparatus and heating according to the first embodiment.

FIG. 17 is a diagram showing a table referred to in the process of FIG. 16.

DESCRIPTION OF EMBODIMENTS

Embodiments of the present invention will be described hereinafter with reference to the drawings. In each of the drawings, the same or corresponding components are denoted by the same signs and will not be described repeatedly.

Figure 1:
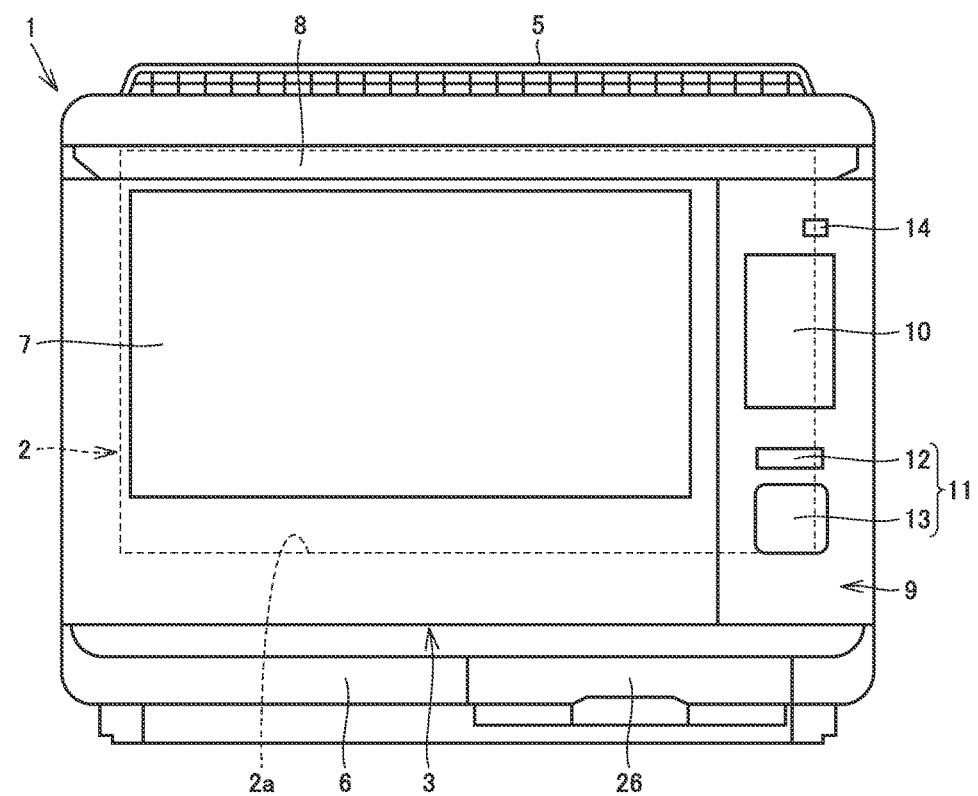
FIG. 1 is a schematic front view of a heating cooker according to a first embodiment with a door closed.
Figure 2:
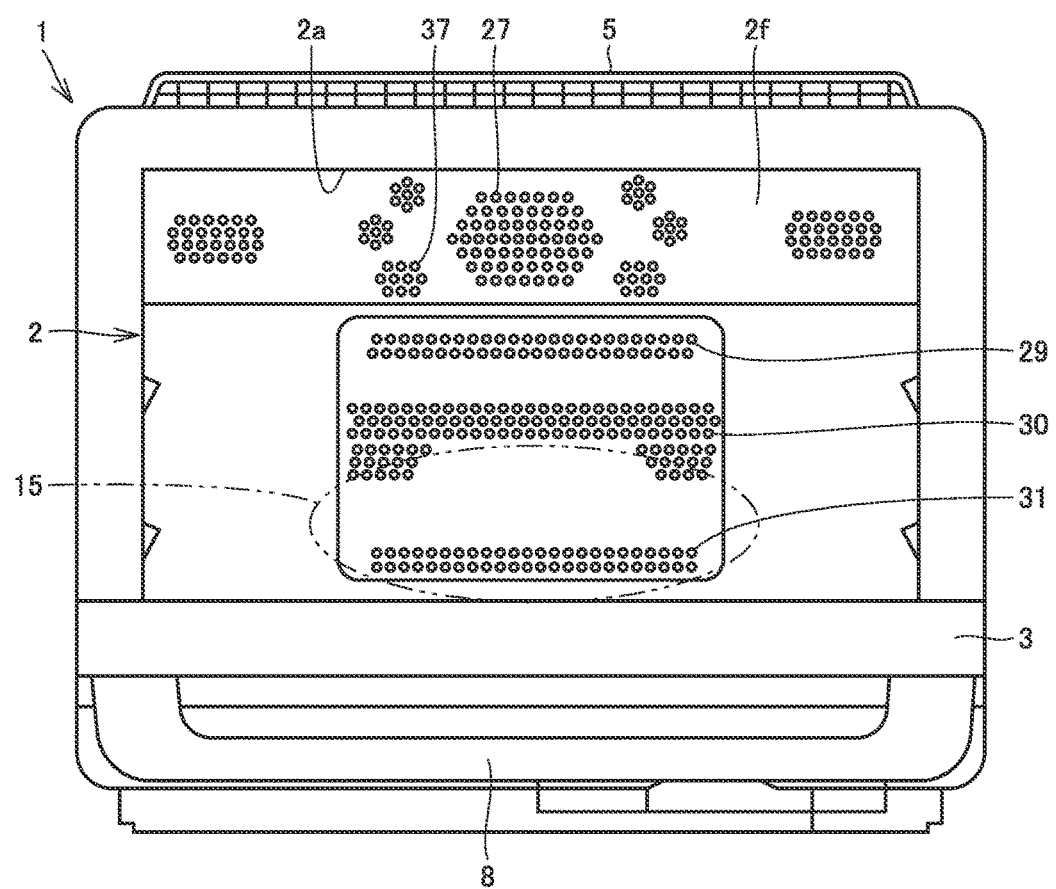
FIG. 2 is a schematic front view of the heating cooker in FIG. 1 with the door opened.
Figure 3:
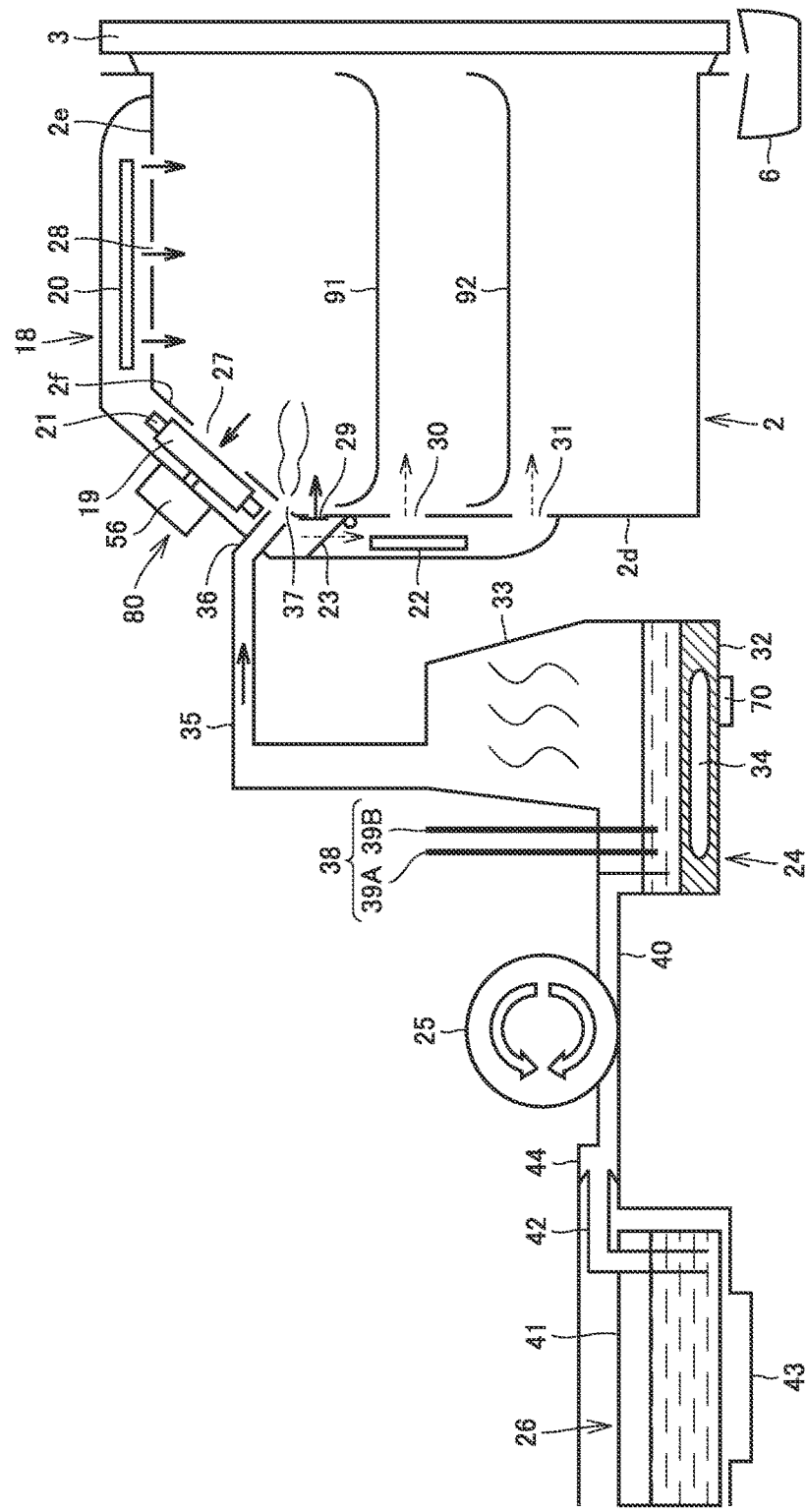
FIG. 3 is a schematic diagram for illustrating the configuration of a main part of the heating cooker according to the first embodiment.

Referring to FIGS. 1 to 3, a heating cooker including a steam generating apparatus according to the embodiments is described. In the following description, the left side refers to the left side when facing and looking at the heating cooker from the door side, and the right side refers to the right side when facing and looking at the heating cooker from the door side.

(First Embodiment)

FIG. 1 is a schematic front view of a heating cooker according to a first embodiment with a door closed. FIG. 2 is a schematic front view of the heating cooker in FIG. 1 with the door opened. As illustrated, the heating cooker includes a casing 1 having a rectangular parallelepiped shape, a heating chamber 2 provided in casing 1 and having an opening 2a at the front, a door 3 for opening and closing opening 2a in heating chamber 2, and a magnetron 4 (shown in FIG. 4) for supplying a microwave into heating chamber 2. Heating chamber 2 is an example of an "accommodation chamber" for accommodating food to be cooked therein.

An exhaust duct 5 is provided on the rear portion of an upper surface of casing 1. A drip pan 6 is removably attached to the lower portion of a front surface of casing 1. Drip pan 6 is located below door 3, and is provided to be able to receive droplets of water from a rear surface of door 3. A feed water tank 26 to be described later is removably attached to the lower portion of the front surface of casing 1. Feed water tank 26 contains water for generating steam to be described later.

Door 3 has a lower portion pivotably attached to the front surface of casing 1. A heat-resistant, transparent external glass 7 is provided at a front surface of door 3 (surface opposite to heating chamber 2). Door 3 also has a handle 8 located above external glass 7, and an operation panel 9 provided on the right side of external glass 7.

Operation panel 9 includes a colored liquid crystal display unit 10 for displaying various types of information, and a group of buttons 11. Group of buttons 11 includes a cancel key 12 which is operated when heating is to be stopped halfway, a start key 13 which is operated when heating is to be started, a menu key for specifying one of various modes of heat cooking, and the like. Operation panel 9 is provided with an infrared reception unit 14 for receiving infrared light from a smart phone and the like. Operation panel 9 is an example of an "operation unit" for accepting operation by a user on the heating cooker.

FIG. 2 schematically shows the inside of heating chamber 2 with door 3 opened. In relation to a position where a food 15 is placed, spouting ports 29, 30, 31, 37 and the like are disposed for delivering steam into the chamber. Air suction ports 27 are also provided. These will be described later in detail.

FIG. 3 schematically shows the configuration of a main part of the heating cooker. FIG. 3 shows heating chamber 2 as seen from the left side.

The heating cooker includes a circulation duct 18, an upper heater 20, a middle heater 21, a lower heater 22, a circulation damper 23, a steam generating apparatus 24, a tube pump 25, and a removable feed water tank 26. Upper heater 20, middle heater 21 and lower heater 22 are each formed of a sheathed heater, for example.

An upper portion 2e of heating chamber 2 is continuous with a rear portion 2d of heating chamber 2 through an inclined portion 2f. The plurality of suction ports 27 are provided in this inclined portion 2f so as to face a circulation fan 19. A plurality of upper spouting ports 28 are provided in upper portion 2e of heating chamber 2. Spouting ports 29, 30 and 31 are provided in rear portion 2d of heating chamber 2.

Cooking trays 91, 92 are accommodated in heating chamber 2. Cooking trays 91, 92 are used to place food to be cooked thereon. When cooking trays 91, 92 are accommodated in the chamber, the placed food is set at a position to which the steam can be delivered through spouting ports 29, 30, 31.

Circulation duct 18 is provided outside heating chamber 2, and is communicated with the inside of heating chamber 2 through suction port 27 and spouting ports 28 to 31. A circulation fan unit 80 having circulation fan 19 is provided so as to cause convection of the air, saturated steam and the like (hereinafter referred to as "the air and the like") in heating chamber 2. "The air and the like" mentioned above is an example of a heat medium for heat cooking.

Upper heater 20 heats the air and the like flowing to spouting ports 28. Middle heater 21 heats the air and the like flowing from circulation fan 19 to upper heater 20, and heats the air and the like flowing from circulation fan 19 to lower heater 22.

Lower heater 22 is disposed in circulation duct 18, and heats the air and the like flowing to spouting ports 30, 31.

Steam generating apparatus 24 is an example of a "steam generator." Steam generating apparatus 24 has a container 32 made of metal with an opening upper end, a cover 33 made of resin for closing the opening, a heater 34 for steam generation (hereinafter also referred to as heater 34) casted into the bottom of container 32 and formed of a sheathed heater, and an in-housing temperature sensor 70 for measuring temperature in container 32. Water from feed water tank 26 is stored on the bottom of container 32, and heater 34 heats the stored water through the bottom of container 32. Saturated steam produced by the heating flows through a steam tube 35 made of resin and a steam tube 36 made of metal, and is supplied into a connection portion with circulation duct 18. Here, if circulation fan 19 is being driven, the saturated steam from steam generating apparatus 24 is delivered into circulation duct 18. If circulation fan 19 is not being driven, on the other hand, this saturated steam flows through the plurality of steam supply ports 37 into heating chamber 2.

The saturated steam spouted by steam tube 36, or the saturated steam in heating chamber 2 is delivered by circulation fan 19 to upper heater 20, middle heater 21 and lower heater 22. These heaters can raise the temperature of the saturated steam to 100° C. or more by heating.

A water level sensor 38 including a pair of electrode bars 39A, 39B is attached to cover 33. Electrode bars 39A, 39B are attached such that they can be immersed in the stored water in container 32. It is detected from output from water level sensor 38 whether or not a conducting state has been established between the electrodes by the immersion. Based on this detection, it is determined whether or not the water level over the bottom of container 32 is a predetermined water level. Water level sensor 38 is an example of a "water level measurement unit" for measuring the water level in container 32.

Container 32 is an example of a "housing" capable of storing water therein. Heater 34 is an example of a "heating unit" for heating the housing. In-housing temperature sensor 70 is an example of a "temperature measurement unit" for measuring the temperature in container 32.

Tube pump 25 is an example of a "pump" for flowing water between steam generating apparatus 24 and feed water tank 26. The heating cooker includes a water feed/discharge tube 40, which is an example of a "flow path unit," for flowing water between feed water tank 26 and the inside of container 32. Specifically, tube pump 25 flows the water in feed water tank 26 to steam generating apparatus 24 by rotating in one direction by squeezing elastically deformable water feed/discharge tube 40 made of silicon rubber or the like through a roller (not shown). Tube pump 25 flows the water in container 32 to feed water tank 26 by rotating in a direction opposite to the one direction. The heating cooker in the first embodiment includes a water discharge unit for discharging the water in container 32. This water discharge unit is configured to include tube pump 25 mentioned above.

Feed water tank 26 has a feed water tank body 41 and a communication tube 42. Communication tube 42 has one end portion located within feed water tank body 41, and the other end portion located outside feed water tank 26. When feed water tank 26 is accommodated in a tank cover 43, the other end portion of communication tube 42 is connected to water feed/discharge tube 40 through a tank joint unit 44. That is, the inside of feed water tank body 41 becomes communicated with the inside of steam generating apparatus 24 through communication tube 42 and the like.

Figure 4:
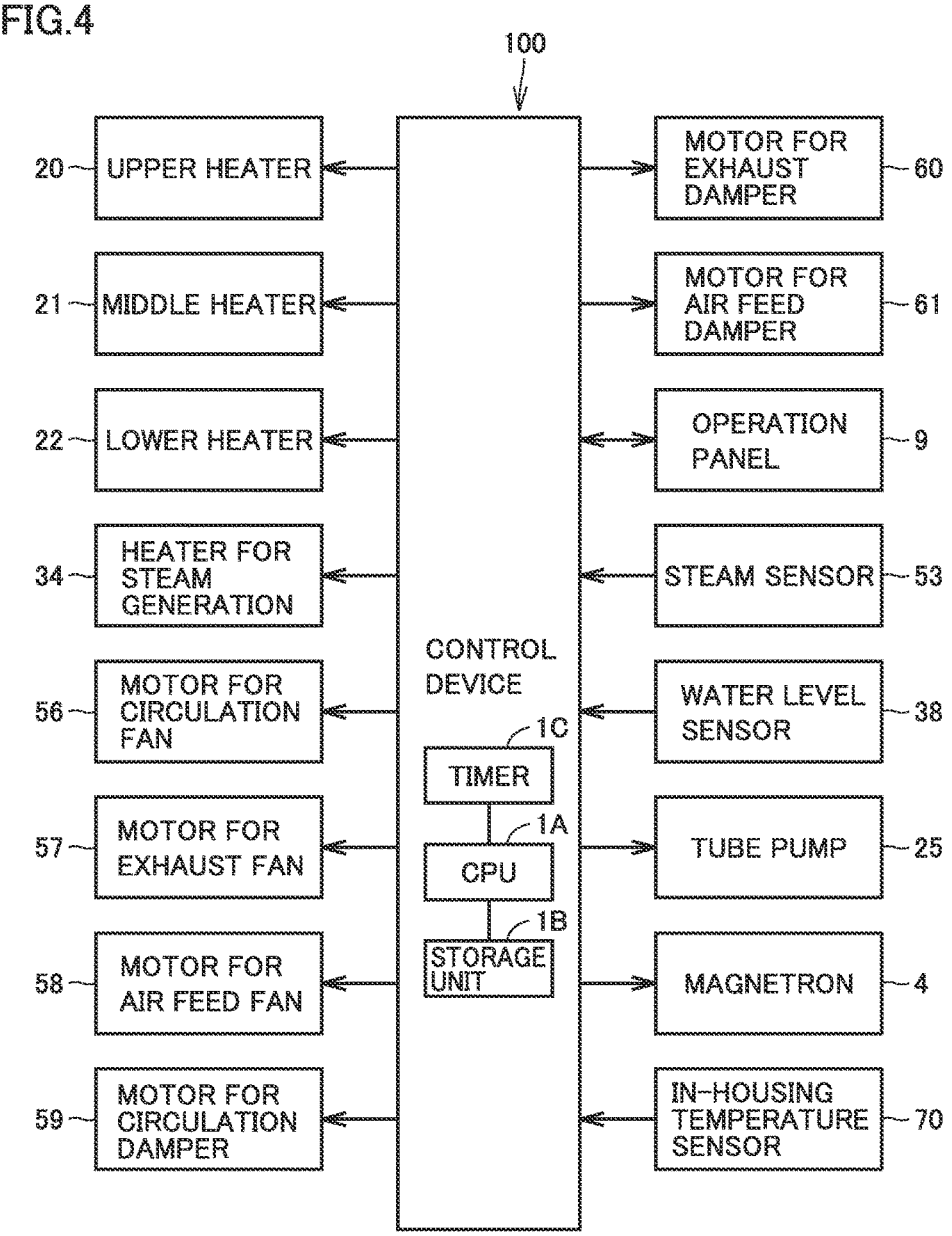
FIG. 4 is a control block diagram of the heating cooker according to the first embodiment.

FIG. 4 is a control block diagram of the heating cooker according to the first embodiment. Referring to FIG. 4, the heating cooker includes, on a not-shown circuit board, a control device 100 formed of an input/output circuit for inputting/outputting signals between a microcomputer and an external circuit. Connected to control device 100 are upper heater 20, middle heater 21, lower heater 22, heater 34 for steam generation, a motor 56 for a circulation fan, a motor 57 for an exhaust fan, a motor 58 for an air feed fan, a motor 59 for a circulation damper, a motor 60 for an exhaust damper, a motor 61 for an air feed damper, operation panel 9, a steam sensor 53, water level sensor 38, tube pump 25, magnetron 4, in-housing temperature sensor 70, and the like.

Control device 100 controls the heaters and motors, as well as tube pump 25 and the like, based on signals from operation panel 9, steam sensor 53, water level sensor 38, in-housing temperature sensor 70, and the like.

Control device 100 includes a timer 1C, a CPU (Central Processing Unit) 1A, and a storage unit 1B formed of a volatile or nonvolatile memory and various types of registers.

FIG. 5 shows a functional configuration and stored contents of the heating cooker according to the first embodiment. Referring to FIG. 5(A), CPU 1A is an example of a "controller" for controlling the heating unit including heater 34 and a water supply unit including tube pump 25.

Referring to FIG. 5(A), CPU 1A includes a counter controller 2A for controlling counters to be described later such that the counters perform counting operation in synchronization with clocking of timer 1C, a feed water controller 2B for controlling tube pump 25 to feed water to steam generating apparatus 24, and a heating controller 2C for controlling heater 34. Each of these units is stored as a program in storage unit 1B in advance. The function of each of these units is implemented by CPU 1A reading and executing these programs. It is to be noted that each of these units may be implemented by a combination of a program and a circuit.

Referring to FIG. 5(B), storage unit 1B includes a region E1 for storing a pump counter 3A and a heater counter 3B, and a region E2 for storing threshold values $\alpha$, $\alpha 1$, $\beta$ and $\beta 1$. Threshold values $\alpha$, $\alpha 1$, $\beta$ and $\beta 1$ correspond to control parameters for controlling heater 34 for heating and tube pump 25 for water feed, respectively.

Pump counter 3A is controlled to count up so as to measure the length of time related to operation or stop of tube pump 25 for feeding water to container 32. Heater counter 3B is controlled to count up so as to measure the length of time related to heating operation in container 32 by heater 34. Although pump counter 3A and heater counter 3B are implemented using, for example, the registers of storage unit 1B, a method for implementation is not limited thereto.

Threshold values $\alpha$, $\alpha 1$, $\beta$ and $\beta 1$ are values compared with count values from pump counter 3A and heater counter 3B in region E1, and are referred to so as to determine a time (period) related to heating and a time (period) related to water feed. Threshold values $\alpha$, $\alpha 1$, $\beta$ and $\beta 1$ will be described later in detail.

Figure 7:
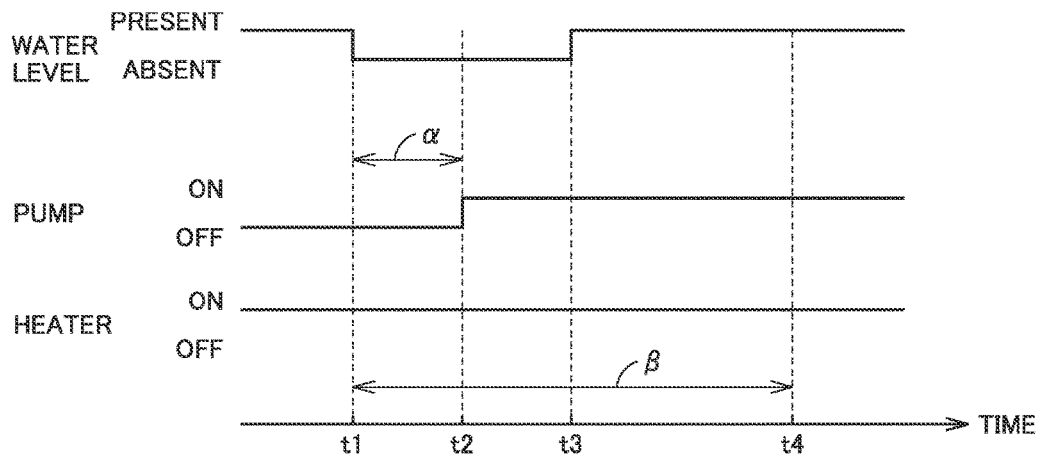
FIG. 7 is a timing chart related to control of water feed and heating according to the first embodiment.
Figure 8:
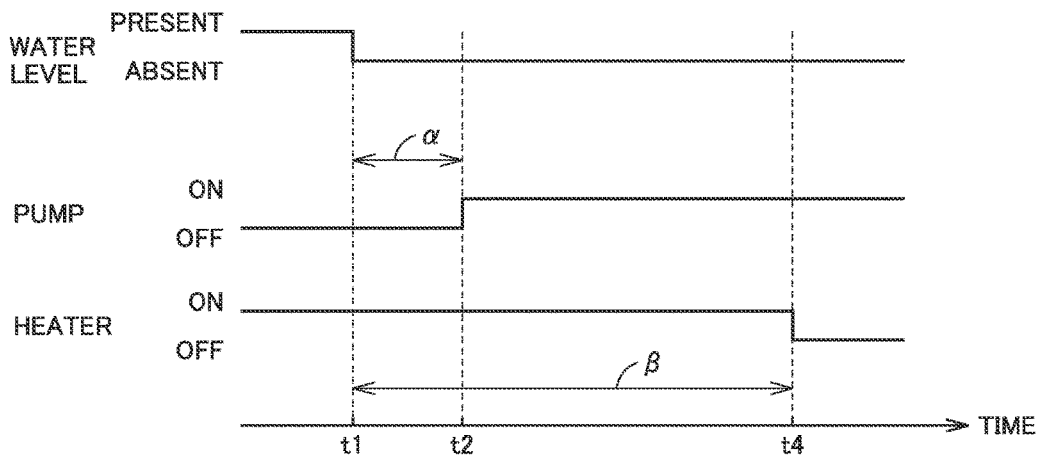
FIG. 8 is a timing chart related to control of water feed and heating according to the first embodiment.

FIG. 6 is a process flowchart related to control of water feed and heating according to the first embodiment of the present invention. This flowchart is stored as a program in storage unit 1B in advance. The process is implemented by CPU 1A reading the program from storage unit 1B and executing the read program. FIGS. 7 to 8 illustrate timing charts related to control of water feed and heating according to the first embodiment of the present invention. In FIGS. 7 to 8, the horizontal axis represents a lapse of time, while the vertical axis represents, in relation to the lapse of time, signals indicating the presence/absence of water level in container 32, ON (operated) or OFF (stopped) of tube pump 25, and ON (heating) or OFF (heating stopped) of heater 34.

Feed water controller 2B controls tube pump 25 by switching between supply of a voltage to tube pump 25 and stop of the supply. Specifically, tube pump 25 rotates when supplied with the voltage, and this rotating operation serves to flow water through the tubes. Tube pump 25 stops rotating when the supply of the voltage is stopped, causing the flow of water to stop as well. Supplying the voltage signal to tube pump 25 by feed water controller 2B in this manner will be referred to as "pump ON," whereas stopping the supply of the voltage signal will be referred to as "pump OFF."

Heating controller 2C supplies a current to heater 34 by duty control. Heater 34 generates heat when supplied with the current, and stops generating heat when the supply of the current is stopped. Here, supplying the current signal to heater 34 by heating controller 2C will be referred to as "heater ON," whereas stopping the supply of the current signal will be referred to as "heater OFF."

In the control according to the first embodiment, when a steam cooking mode is executed, heat cooking is performed using steam from steam generating apparatus 24.

When this steam cooking mode is executed, CPU 1A performs ON/OFF control of heater 34 and tube pump 25 such that a predetermined amount of water is stored in container 32 in a stable manner while steam is generated. As a result, a satisfactory finished state of the food can be obtained by the steam cooking.

Figure 9:
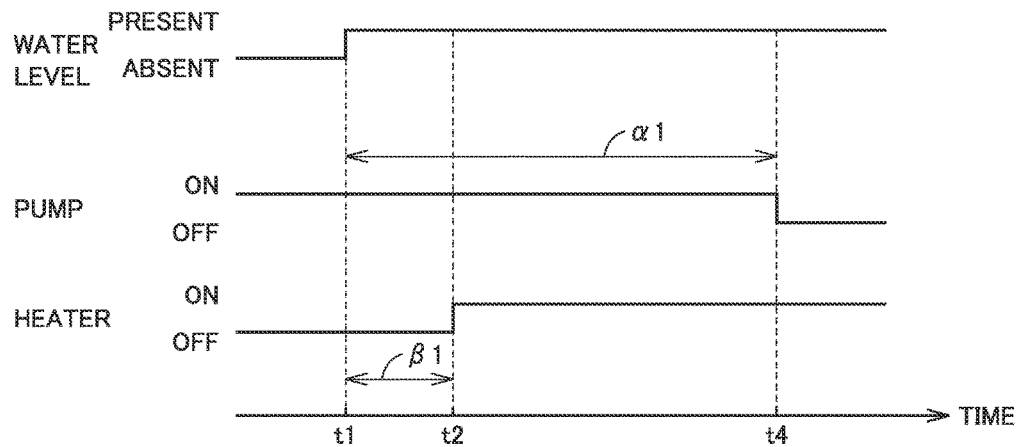
FIG. 9 is a timing chart related to control of water feed and heating according to the first embodiment.

In accordance with the flowchart of FIG. 6, and referring to timing charts of FIGS. 7 to 9 as appropriate, the control of water feed to the steam generating apparatus and heating is described. It is to be noted that a threshold value TH mentioned below refers to a water level (stored water level) from a bottom surface of container 32, at which electrode bars 39A, 39B of water level sensor 38 can be brought into conduction with each other. A determination unit of CPU 1A determines "water present" based on output from water level sensor 38 in a conducting state, and determines "water not present" based on output from water level sensor 38 in a non-conducting state (the water level is below threshold value TH).

Referring to FIG. 6(A), normal operation during execution of the steam cooking mode (heater 34 and tube pump 25 are being subjected to ON/OFF control) (see FIG. 7) is described. During "pump OFF" and "heater ON," CPU 1A determines whether or not "water present" changes to "water not present" based on output from water level sensor 38 (step S3). When this change is not determined (NO in step S3), step S3 is repeated.

When a change from "water present" to "water not present" is determined (YES in step S3), counter controller 2A initializes pump counter 3A and heater counter 3B (for example, sets 0) (step S5).

Then, the stored water level in container 32 is measured (this will be hereinafter also referred to as a measured water level) based on output from water level sensor 38. Then, it is determined whether or not a condition of (measured water level<threshold value TH) is satisfied (step S7). When it is determined that the condition is not satisfied (NO in step S7), the process returns to step S3. In this manner, when "water present" is determined, that is, when it is determined that the water level in container 32 has been restored, based on the condition of (measured water level<threshold value TH), a subsequent process from step S9 to be described later is not performed, and normal ON/OFF control of heater 34 and tube pump 25 is performed.

When it is determined that the condition of (measured water level<threshold value TH) is satisfied (YES in step S7), on the other hand, which means that "water not present" is determined, namely, that the water level has not been restored, ON/OFF control is performed so as to increase the water level in container 32, and more specifically, to restore the measured water level to threshold value TH.

First, counter controller 2A causes pump counter 3A and heater counter 3B to start count-up (step S9). After the start of the count-up, the count-up continues in synchronization with clocking of timer 1C. Then, CPU 1A determines whether or not a condition of (count value of pump counter 3A>threshold value α) is satisfied (step S11). When it is determined that the condition is not satisfied (NO in step S11), the process returns to step S7 and the subsequent process is repeated in a similar manner.

When it is determined that the condition is satisfied (YES in step S11), on the other hand, feed water controller 2B causes switching from "OFF control" to "ON control" of tube pump 25 (step S13). The process then returns to step S3. Accordingly, the water in feed water tank 26 starts to be supplied into container 32 so as to restore the water level in container 32.

In this manner, when it is determined that the measured water level does not exceed threshold value TH (when it is determined that "water present" has changed to "water not present"), and thereafter, when a time during which the measured water level does not exceed threshold value TH continues for a first time indicated by threshold value α (when a time between times t1 and t2 in FIG. 7 elapses), ON control of tube pump 25 is started so as to start water supply into container 32. It is to be noted that threshold value α corresponds to the length of time, which is a sufficiently short time, required to sufficiently absorb noise included in the output from water level sensor 38 (which includes circuit noise) to obtain a stable measured water level. Threshold value α is predetermined by experiment or the like in advance.

In addition, CPU 1A determines whether or not a condition of (count value of heater counter 3B>threshold value β) is satisfied (step S15). When it is determined that the condition is not satisfied (NO in step S15), the process returns to step S7 and the subsequent process is repeated in a similar manner.

When it is determined that the condition is satisfied (YES in step S15), on the other hand, heating controller 2C causes switching from "ON control" to "OFF control" of heater 34 (step S17). The process then returns to step S3. Accordingly, when the water level in container 32 is not restored to threshold value TH (the amount of water is low), the heating is stopped. A dry-up state can thus be avoided. As used herein, the dry-up state refers to a dry state in which container 32 becomes empty of the stored water and scale may be deposited on an inner wall of container 32.

In this manner, when it is determined that the measured water level does not exceed threshold value TH, and thereafter, when a time during which it is determined that the measured water level does not exceed threshold value TH continues for a second time indicated by threshold value β, heater 34 is controlled to stop heating of container 32. In other words, during the normal operation shown in FIG. 7, water feed is normally performed by ON control (water feed) of tube pump 25, so that the water level in container 32 can be restored between times t1 and t4. Thus, during the normal operation when the normal water feed is performed, switching from "ON control" to "OFF control" of heater 34 by heating controller 2C is not performed. Therefore, steam generation can be continued in a stable manner.

However, when there is an abnormality in the water feed by tube pump 25 and the water level is not restored between times t1 and t4 (time corresponding to threshold value β) (see FIG. 8), at time t4 in FIG. 8, switching from "ON control" to "OFF control" of heater 34 is performed by heating controller 2C (step S17). Accordingly, in case of an abnormality where the water level cannot be restored even by the "ON control" of tube pump 25, the heating by heater 34 can be stopped to avoid dry-up or prevent scale deposition.

Here, a relation of (threshold value α>threshold value β) applies. Threshold value β represents the length of time required for the level of water stored in container 32 to vary from threshold value TH to a predetermined residual water level by evaporation. For example, threshold value TH is a water level corresponding to 25 to 30 ml, for example, and the residual water level is a water level that can avoid dry-up, and corresponds to 10 to 15 ml, for example.

Next, in a similar manner, operation during a temporary water feed abnormality during execution of the steam cooking mode (see FIG. 9) is described with reference to FIG. 6(B).

For example, during "pump ON" and "heater OFF" after a lapse of time t4 in FIG. 8, CPU 1A determines whether or not "water not present" changes to "water present" based on output from water level sensor 38 (step S23). When this change is not determined (NO in step S23), step S23 is repeated.

When a change from "water not present" to "water present" is determined (YES in step S23), counter controller 2A initializes pump counter 3A and heater counter 3B (for example, sets 0) (step S25).

Then, it is determined, based on output from water level sensor 38, whether or not the water level is sufficient, that is, whether or not a condition of (measured water level>threshold value TH) is satisfied (step S27). When it is determined that the condition is not satisfied (NO in step S27), the process returns to step S23 and ON control of tube pump 25 is performed. In this manner, when the water level in container 32 is not yet sufficient, a subsequent process from step S29 to be described later is not performed, and water feed is performed by the ON control of tube pump 25.

When it is determined that the condition of (measured water level>threshold value TH) is satisfied (YES in step S27), on the other hand, which means that the water level has been restored by the water feed, ON/OFF control is performed so as to maintain the water level in container 32 at an appropriate amount, and more specifically, to maintain the water level at threshold value TH.

First, counter controller 2A causes pump counter 3A and heater counter 3B to start count-up (step S29). When the count-up is started, CPU 1A determines whether or not a condition of (count value of heater counter 3B>threshold value β1) is satisfied (step S35). When it is determined that the condition is not satisfied (NO in step S35), the process returns to step S27 and the subsequent process is repeated in a similar manner.

When it is determined that the condition is satisfied (YES in step S35), on the other hand, heating controller 2C causes switching from "OFF control" to "ON control" of heater 34 (step S37). The process then returns to step S3.

Even when heater 34 is subjected to OFF control due to the water feed abnormality of FIG. 8, if a time during which the measured water level exceeds threshold value TH continues for a time indicated by threshold value β1, heater 34 is subjected to ON control to immediately generate steam, so that the steam can be supplied into heating chamber 2 in a stable manner.

In addition, CPU 1A determines whether or not a condition of (count value of pump counter 3A>threshold value α1) is satisfied (step S31). When it is determined that the condition is not satisfied (NO in step S31), the process returns to step S27 and the subsequent process is repeated in a similar manner.

When it is determined that the condition is satisfied (YES in step S31), on the other hand, feed water controller 2B causes switching from "ON control" to "OFF control" of tube pump 25 (step S33). The process then returns to step S23. Accordingly, the water feed from feed water tank 26 is stopped so as to maintain the water level in container 32 at the appropriate amount.

In this manner, when it is determined that the measured water level exceeds threshold value TH (time t1 in FIG. 9), and thereafter, when a time during which it is determined that the measured water level exceeds threshold value TH continues for a third time indicated by threshold value $\beta 1$ (between times t1 and t2 in FIG. 9), ON control of heater 34 is started so as to start heating of the inside of container 32, and when the time during which it is determined that the measured water level exceeds threshold value TH continues for a fourth time (time indicated by threshold value $\alpha 1$) longer than threshold value $\beta 1$ (third time), OFF control of tube pump 25 is performed so as to stop the water supply into container 32.

It is to be noted that threshold value $\beta 1$ corresponds to the length of time, which is a sufficiently short time, required to sufficiently absorb circuit noise and the like included in the output from water level sensor 38 to obtain a stable measured water level. Threshold value $\beta 1$ is determined by experiment or the like in advance.

In this manner, when the water level in container 32 has been restored, heating can be started early to thereby supply the steam into heating chamber 2 in a stable manner.

Figure 10:
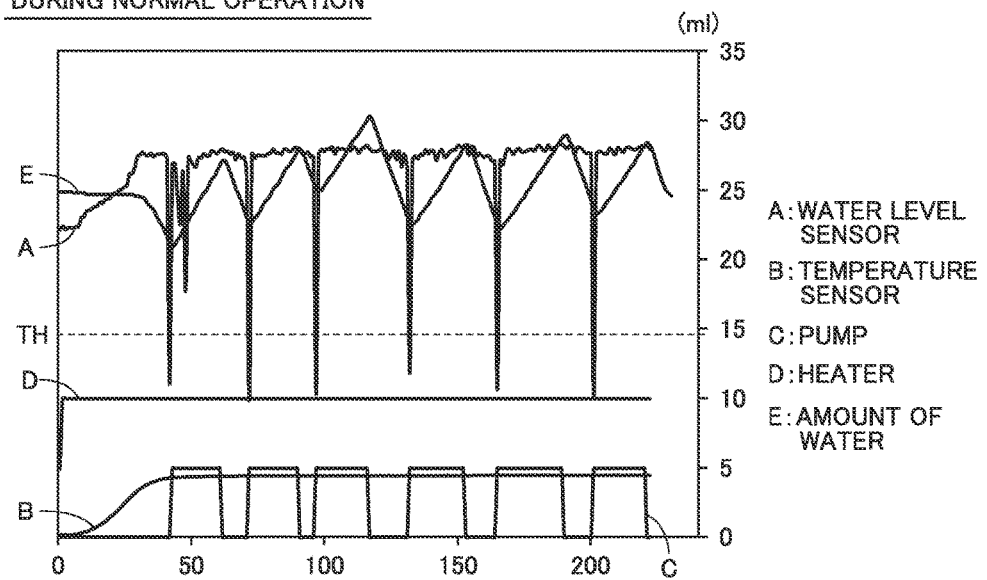
FIG. 10 is a diagram schematically showing signal waveforms during normal operation according to the first embodiment.
Figure 11:
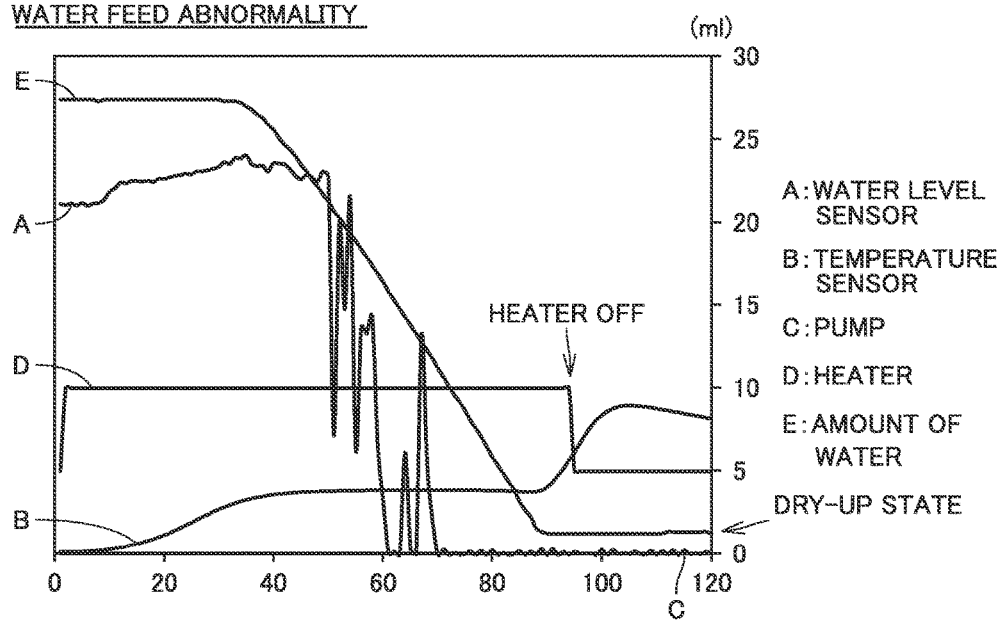
FIG. 11 is a diagram schematically showing signal waveforms when heating is stopped based on measured temperature during a water feed abnormality.
Figure 12:
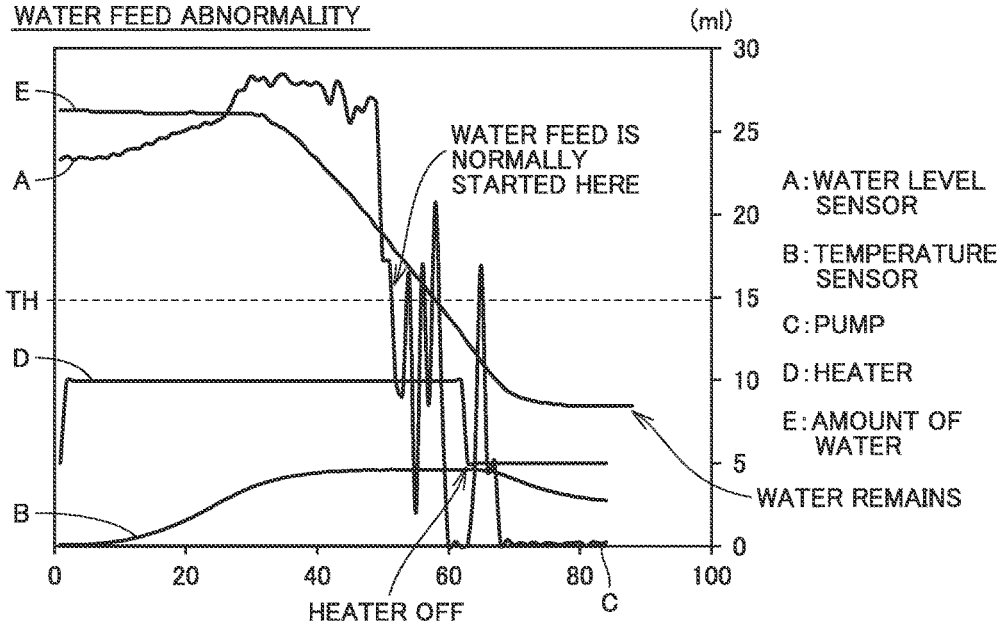
FIG. 12 is a diagram schematically showing signal waveforms when heating is stopped based on a measured water level during a water feed abnormality according to the first embodiment.

FIGS. 10 to 12 are diagrams of data acquired by experiment, for illustrating ON/OFF control of tube pump 25 and heater 34 according to the first embodiment. In each of these figures, the horizontal axis represents a lapse of time, while the vertical axis schematically represents, in relation to the lapse of time, variation in a measured water level A from water level sensor 38, a measured temperature B from in-housing temperature sensor 70, a signal C of ON/OFF of tube pump 25, a signal D of ON/OFF of heater 34, and an amount of water E in container 32. The control according to the embodiment is further described with reference to FIGS. 10 to 12.

Referring to FIG. 10, during normal operation, when "water not present" is determined, feed water controller 2B performs ON control of tube pump 25. Accordingly, before a lapse of the time of threshold value $\beta$ for performing OFF control of heater 34, the water level is restored to a water level corresponding to "water present." Thus, heater 34 can always be subjected to ON control. As a result, steam can be generated in a stable manner.

FIGS. 11 and 12 show operations during a water feed abnormality. Conventionally, as shown in FIG. 11, when heater 34 is controlled based on measured temperature, heater 34 is stopped after the measured temperature rises. At a point in time when heater 34 is stopped, therefore, there is a possibility that a dry-up state has already been established in container 32, resulting in inability to avoid scale deposition and lowered heating efficiency.

In the control during a water feed abnormality according to the first embodiment shown in FIG. 12, in contrast, even when the water level is not restored due to the water feed abnormality, heater 34 can be subjected to OFF control promptly thereafter (at the time of threshold value $\beta$). Accordingly, heater 34 can be subjected to OFF control while an amount of water that can allow a dry-up state remains in container 32. Thus, the scale deposition as in FIG. 11 can be avoided to maintain the heating efficiency.

(Second Embodiment)

A second embodiment illustrates a variation of the first embodiment.

In the second embodiment, a time between sensing the water level during water feed and stopping the water feed is set to different lengths. Specifically, this time is set to different lengths between when the water is boiling and a water surface in container 32 tends to move (high water temperature) and when the water temperature is low and the water surface in container 32 is substantially static. According to the water level control of this embodiment, therefore, hunting of pump ON/OFF can be prevented to maintain a stable water level.

Figure 13:
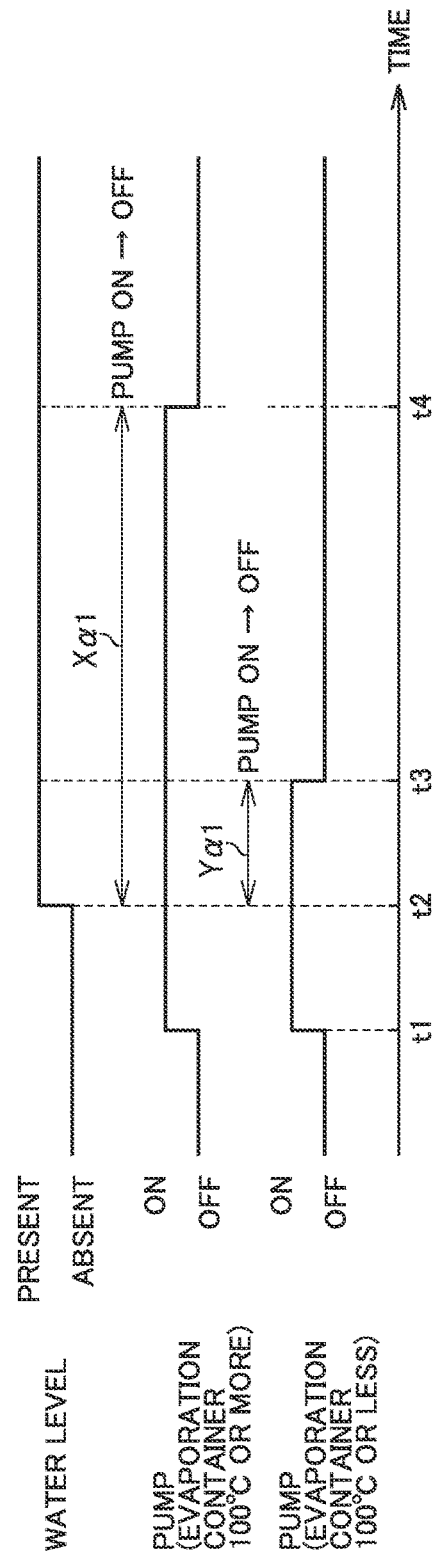
FIG. 13 is a timing chart for illustrating water feed control according to a second embodiment.

FIG. 13 is a timing chart for illustrating the water level control according to the second embodiment. In FIG. 13, the horizontal axis represents a lapse of time, while the vertical axis represents, in relation to the lapse of time, a measured water level in container 32 and ON/OFF of tube pump 25. FIG. 13 shows an example where the temperature in container 32 is 100° C. or more, for example, during operation of the steam cooking mode, and an example where the temperature in container 32 is 100° C. or less, for example, during initial water feed at the start of the steam cooking mode.

In this embodiment, feed water controller 2B performs ON/OFF control of tube pump 25 such that the water level at which "water present" can be determined based on threshold value TH is maintained for stable generation of steam. It is thus required to accurately control a time between sensing the water level during the water feed into container 32 and stopping the water feed. In the second embodiment, as shown in FIG. 13, the length of time of water feed by ON control of tube pump 25 is varied depending on the temperature measured by in-housing temperature sensor 70. Specifically, feed water controller 2B varies the length of a water feed time $X\alpha 1$ when the measured temperature is greater than or equal to a predetermined temperature (for example, 100° C.) to be longer than a water feed time $Y\alpha 1$ when the measured temperature is less than the predetermined temperature.

Accordingly, during boiling when the water surface moves, "ON control" of tube pump 25 is performed until the water level is stabilized, so that hunting of the ON/OFF control of tube pump 25 can be prevented to stabilize the control. When the water temperature is low and the water surface is substantially static, water feed is immediately stopped after the water level is measured, thus allowing heater 34 to start the heating.

(Third Embodiment)

Figure 14:
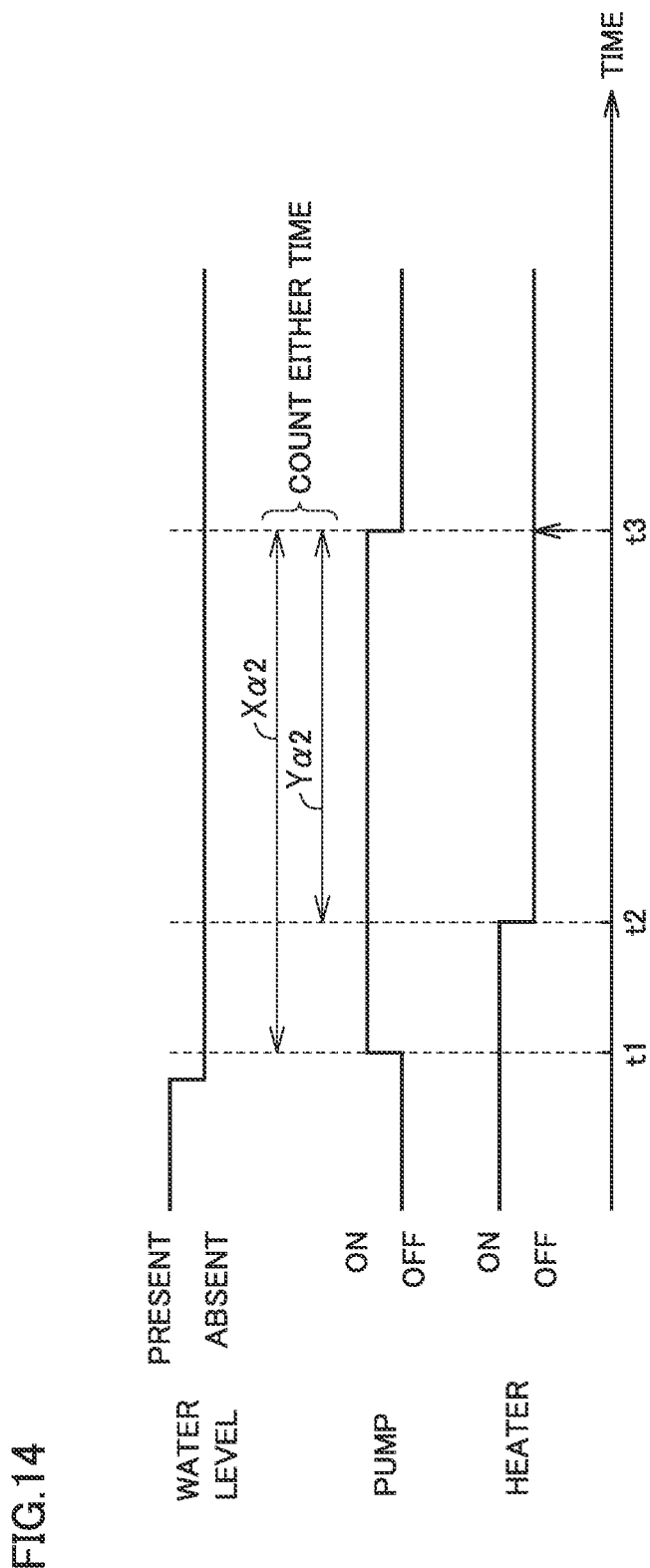
FIG. 14 is a timing chart related to control of water feed and heating according to a third embodiment.

A third embodiment illustrates a variation of the first or second embodiment. In this embodiment, "water not present" in feed water tank 26 is determined from the measured water level based on output from water level sensor 38. FIG. 14 is a timing chart for illustrating the control according to the third embodiment. In FIG. 14, the horizontal axis represents a lapse of time, while the vertical axis represents, in relation to the lapse of time, the measured water level in container 32, ON/OFF of tube pump 25, and ON/OFF of heater 34.

CPU 1A has two timings for determining "water not present" in feed water tank 26. The first timing is when ON control of tube pump 25 has been performed such that supply operation of delivering the water in feed water tank 26 into container 32 is continued for a predetermined time since the start of water supply into container 32 (see a time Xα2 in FIG. 14). The second timing is when the water feed operation has been continued by ON control of tube pump 25 for a predetermined time (time Yα2 in FIG. 14) since the start of OFF control of heater 34 (heating stopped). When it is determined that the measured water level has exceeded threshold value TH at either the first or second timing, it is determined that the water level has been restored, namely, that the water is present in feed water tank 26. When (measured water level<threshold value TH) is determined at both the first and second timings, namely, when the water level cannot be restored, on the other hand, it is determined that the water is not present in feed water tank 26.

In addition, CPU 1A displays the determination result via colored liquid crystal display unit 10, or outputs the determination result via a not-shown audio output unit. The user can thus be prompted to supply water to feed water tank 26.

According to the third embodiment, "water not present" in feed water tank 26 can be determined without providing the function of measuring the water level in feed water tank 26.

(Fourth Embodiment)

A fourth embodiment illustrates a variation of the first to third embodiments. In the fourth embodiment, CPU 1A controls tube pump 25 to deliver the water in container 32 to feed water tank 26. Accordingly, for example, tube pump 25 is rotated in the opposite direction so as to return to feed water tank 26 the water remaining in container 32 upon termination of cooking in a steam mode or after a lapse of a prescribed time since the termination (hereinafter also referred to as residual water). The residual water remaining in container 32 upon termination of the steam cooking mode, which has a relatively high concentration of calcium carbonate, can thus be discharged toward feed water tank 26.

Although the residual water in container 32 is discharged toward feed water tank 26 in the fourth embodiment, a water discharge path is not limited thereto. For example, a path of discharging the water toward drip pan 6 may be provided.

(Fifth Embodiment)

Figure 15:
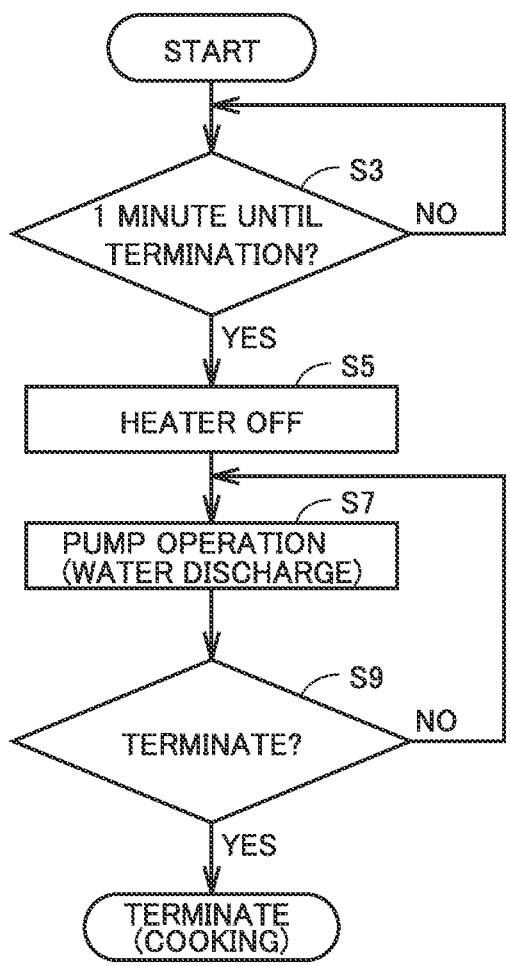
FIG. 15 is a process flowchart related to water discharge control according to a fifth embodiment of the present invention.

FIG. 15 is a process flowchart related to water discharge control according to a fifth embodiment of the present invention. This flowchart is stored as a program in storage unit 1B in advance. The process is implemented by CPU 1A reading the program from storage unit 1B and executing the read program.

In the fifth embodiment, heat cooking using steam (hereinafter referred to as steam cooking) can be executed in the heating cooker, where operation is performed such that the residual water in container 32 is discharged each time the steam cooking is executed. Particularly, in this embodiment, the water discharge unit is controlled to start discharge of the water in container 32 during execution of the steam cooking.

More specifically, CPU 1A controls the heating cooker to complete the water discharge upon termination of the steam cooking, by starting a process of discharging the stored water in container 32 and the water in water feed/discharge tube 40 to feed water tank 26 before the termination of the cooking. It is to be noted that, during execution of the steam cooking, the stored water in container 32 has a constant amount (for example, about 50 milliliters).

Referring to FIG. 15, during execution of the steam cooking, CPU 1A determines, based on output from timer 1C, whether or not a remaining time until the termination of cooking has reached one minute (step S3). When it has not yet reached one minute (NO in step S3), the determination in step S3 is repeated.

When it is determined that the remaining time has reached one minute (YES in step S3), CPU 1A causes switching from "ON" to "OFF" (heating stopped) of heater 34 (step S5). Although the heating by heater 34 is stopped when the remaining time has reached one minute in this manner, there is a sufficient amount of steam present in heating chamber 2, and therefore, a finished state of the cooking is not affected even when the heating stops.

In addition, CPU 1A controls tube pump 25 to rotate in the opposite direction. Accordingly, discharge of the stored water in container 32 and the residual water in water feed/discharge tube 40 into feed water tank 26 is started.

CPU 1A determines whether or not the water discharge has ended (step S9). That is, CPU 1A determines, based on output from timer 1C, whether or not the water discharge has ended based on whether or not one minute, for example, has elapsed since the start of the water discharge. When it is not determined that the water discharge has ended (NO in step S9), the process returns to step S7, whereas when it is determined that the water discharge has ended (YES in step S9), the water discharge is ended. That is, CPU 1A stops tube pump 25. At this time, the steam cooking is also terminated.

Although the time required to discharge the stored water in container 32 and the residual water in water feed/discharge tube 40 is set to one minute in FIG. 15, the time is not limited to one minute. In addition, the required time is more specifically a time required to discharge all of the amount of stored water in container 32 (amount of stored water from which the amount of water evaporated during this required time has been subtracted) and the amount of residual water in water feed/discharge tube 40, and can be obtained by experiment or the like in advance.

In this manner, according to the process of FIG. 15, the water discharge can be completed during execution of the steam cooking. Accordingly, it is not required to provide a special time for water discharge after the termination of the steam cooking, thereby allowing the user to start another heat cooking immediately after the termination of the steam cooking.

Moreover, the water discharge process of FIG. 15 is not based on a method of discharging water in a container according to the principle of a siphon by additional water feed as in PTD 1. Therefore, the user does not need to perform additional water feed for water discharge into feed water tank 26, whereby excellent usability of the heating cooker is attained. Feed water tank 26 does not need to have a large capacity to be able to contain an amount of water for additional water feed, either.

(Variation of Fifth Embodiment)

In the fifth embodiment, a detection unit is provided for detecting whether or not feed water tank 26 to which the water is discharged has been mounted on the heating cooker, and the water discharge is performed when it is detected that feed water tank 26 has been mounted. Specifically, the heating cooker includes a hardware switch (not shown) in a portion where feed water tank 26 is mounted. The hardware switch outputs an ON signal when feed water tank 26 is mounted, and outputs an OFF signal when feed water tank 26 is unmounted.

When it is determined that feed water tank 26 has been removed (is unmounted) based on output from the hardware switch, CPU 1A provides a notification to that effect without performing the water discharge. Specifically, the notification is provided by displaying a message for prompting mounting of feed water tank 26 on colored liquid crystal display unit 10. It is to be noted that a manner in which the notification is provided is not limited to message display.

When cooking is interrupted by the user's operation of operation panel 9 during execution of steam cooking, an initial screen at the start of cooking is displayed on colored liquid crystal display unit 10. Then, when a predetermined time has elapsed without the user's operation of the heating cooker, CPU 1A may perform the water discharge process from step S5 in FIG. 5.

(Sixth Embodiment)

Figure 16:
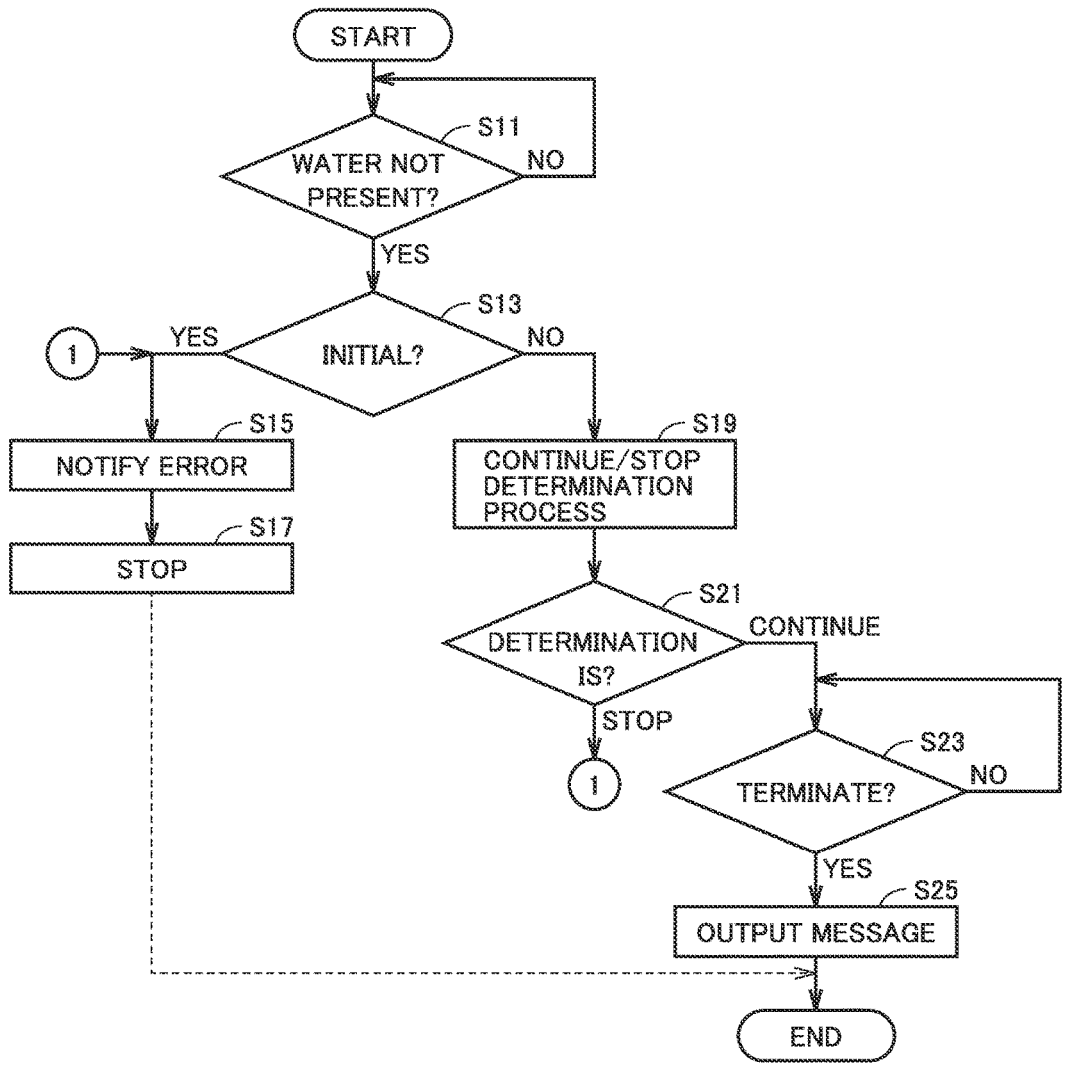
FIG. 16 is a process flowchart related to control of steam cooking according to the sixth embodiment of the present invention.

FIG. 16 is a process flowchart related to control of steam cooking according to a sixth embodiment of the present invention. This flowchart is stored as a program in storage unit 1B in advance. The process is implemented by CPU 1A reading the program from storage unit 1B and executing the read program. FIG. 17 is a diagram showing a table referred to in the process of FIG. 16. A table TB in FIG. 17 is stored in storage unit 1B in advance. The contents of table TB include information acquired by experiment or the like.

Referring to FIG. 17, table TB stores mode data M1 for identifying one of various types of steam cooking modes, control information M2 indicating, correspondingly to each mode data M1, the contents of control of the heating cooker when "water not present" is determined during initial water feed at the start of steam cooking, and control information M3 indicating the contents of control when "water not present" is determined during execution of the cooking subsequent to the initial water feed.

Mode data M1 varies depending on a combination of a type of a cooking mode (steam, soft steam, light emission, etc.) and an input time (the length of a set cooking time). A type of a cooking mode is determined by a method of controlling the heating by heater 34 (duty ratio control).

In addition, in the sixth embodiment, a determination of "water not present" is made that indicates the absence of water for steam generation. Phenomena of this "water not present" include the inability to supply water into container 32 by tube pump 25, and the absence of water in feed water tank 26.

The determination of "water not present" is made based on output from water level sensor 38. In other words, when the stored water level from the bottom surface of container 32 is higher than or equal to threshold value TH, electrode bars 39A, 39B of water level sensor 38 are in a conducting state, and the determination unit of CPU 1A determines "water present" based on output from water level sensor 38. When the stored water level in container 32 is lower than threshold value TH and the electrode bars are in a non-conducting state, on the other hand, the determination unit determines "water not present" based on output from water level sensor 38.

Turning back to FIG. 17, as illustrated, the contents of control during execution of steam cooking by the heating cooker are varied depending on the timing when "water not present" was determined by CPU 1A. Specifically, when "water not present" was determined during the initial water feed, the heating cooker is controlled in accordance with control information M2. When the determination was made thereafter and until the termination of the cooking, the heating cooker is controlled in accordance with control information M3. Control information M3 includes, depending on the type of mode data M1, control information M31 on a time between after the initial water feed and a lapse of a predetermined time, and control information M32 on a time thereafter and until the termination of the cooking. A flag F of control information M32 indicates a message to be output after the termination of execution of the steam cooking.

In the sixth embodiment, CPU 1A of the heating cooker shown in FIGS. 1 to 4 controls each unit such that, when a predetermined time has elapsed since the start of the steam cooking, the steam cooking continues even if there is an insufficiency of water for steam generation. This process is described with reference to FIGS. 16 and 17. Although the description will be made of an example where the user has set (input) ("steam," 0 second≤t<9 minutes and 30 seconds as an input time t) as a set mode by operating operation panel 9 for the purpose of brevity, the process can be performed in a similar manner for other set contents.

First, when steam cooking is started by operation of operation panel 9, timer 1C starts clocking. CPU 1A operates tube pump 25 for 30 seconds, for example, such that water is fed into container 32 to the water level of threshold value TH described above. Accordingly, initial water feed into container 32 is performed, and normally the water can be stored to the water level of threshold value TH by this water feed for 30 seconds.

After the initial water feed for 30 seconds described above, CPU 1A starts control of each unit including heater 34 in accordance with the set mode. Accordingly, steam cooking involving heating by heater 34 is started.

During the initial water feed and during execution of the steam cooking, CPU 1A repeats the process of FIG. 16 at sufficiently short intervals.

First, CPU 1A determines whether or not "water not present" is determined based on output from water level sensor 38 (step S11). When "water not present" is not determined, step S11 is repeated.

When "water not present" is determined (YES in step S11), CPU 1A determines whether or not it is during the initial water feed based on output from timer 1C (time elapsed since the start of the steam cooking) (step S13). When the output from timer 1C indicates 30 seconds, it is determined that it is during the initial water feed.

When it is determined that it is during the initial water feed (YES in step S13), CPU 1A searches table TB based on the set mode described above, reads control information M2 corresponding to the corresponding one of mode data M1, and controls each unit based on read control information M2 (steps S15, S17). For example, CPU 1A provides a notification of an error by outputting an error message to colored liquid crystal display unit 10 (step S15), then stops tube pump 25 and the like to thereby forcibly stop the execution of the steam cooking.

It is to be noted that the initial water feed may be performed prior to the user's mode setting operation. In that case, that is, when "water not present" is determined during the initial water feed during the mode setting, CPU 1A forcibly stops, after the start of heating by heater 34, the execution of the steam cooking including stop of the heating by heater 34.

When it is determined that it is not during the initial water feed (NO in step S13), CPU 1A determines whether to continue or stop the execution of the steam cooking (step S19). That is, CPU 1A searches table TB based on the set mode specified by the user described above, and reads control information M3 corresponding to mode data M1 of this setting mode from table TB. Then, based on the read control information and the output from timer 1C (time elapsed since the start of the cooking), CPU 1A determines whether to continue or stop the execution of the steam cooking. In this case, based on the user's set mode described above, control information M3 indicated by an arrow AR in FIG. 17 is read. At this time, when it is determined that the elapsed time is before 3 minutes until a cooking termination time (9 minutes and 30 seconds) of the set mode, that is, the elapsed time is equal to or less than 6 minutes and 30 seconds, CPU 1A reads control information M31, and forcibly stops the steam cooking in accordance with read control information M31 ("STOP" in step S21). Then, the process of step S15 and step S17 is performed in a similar manner.

When it is determined that the elapsed time indicates a time of less than 3 minutes until the cooking termination time (9 minutes and 30 seconds) of the set mode, that is, the elapsed time is greater than 6 minutes and 30 seconds, CPU 1A reads control information M32, and continues the execution of the steam cooking in accordance with read control information M32 ("CONTINUE" in step S21). At this time, CPU 1A may stop tube pump 25 and heater 34.

Then, CPU 1A determines whether or not the cooking termination time (lapse of 9 minutes and 30 seconds since the start) has been reached based on output from timer 1C (step S23). Until the cooking termination time is reached (NO in step S23), step S23 is repeated. While the determination of step S23 is repeated, although steam is not supplied from steam generating apparatus 24, heat cooking can be performed using the steam present in heating chamber 2.

When it is determined that the cooking termination time has been reached (YES in step S23), on the other hand, CPU 1A controls each unit to terminate the steam cooking. Then, CPU 1A outputs a message indicated by flag F of control information M32 described above to colored liquid crystal display unit 10 (step S25). The process of FIG. 16 ends thereafter.

Here, in table TB, flags F are registered correspondingly to cooking modes in which the finished cooking may be affected if the steam cooking continues after the water is gone. A message represented by each flag F indicates that the cooking has been performed without supply of steam during a portion of the set cooking time (for example, for 3 minutes before the termination of the cooking). The message may also include the length of the time during which steam was not supplied.

Accordingly, when the finished cooking is not good, the user can determine, by confirming the message, that the poor finish results from the execution of the cooking without supply of steam during a portion of the steam cooking time.

According to the sixth embodiment, the heating cooker includes the accommodation chamber (heating chamber 2) for accommodating food therein, and further includes: the steam generator having the housing (container 32) capable of storing water therein, and the heating unit (heater 34) for heating the housing so as to generate steam; and the controller (CPU 1A) for controlling the heating cooker. The controller varies the method of controlling the steam generator (particularly the heating unit) when "water not present" (for example, no water is contained in feed water tank 26) is determined in each step of the steam cooking using steam (during the initial water feed, the time after the initial water feed and until a lapse of the predetermined time, the time thereafter and until the termination of the cooking).

The controller may further vary the above control method for each steam cooking mode.

The above control method includes stopping the steam generation by the steam generator. When the controller controls the steam generation to stop the steam generation during execution of steam cooking, the controller provides a notification to that effect upon termination of the steam cooking. The contents of this notification may include information about a time when the steam generation was stopped.

(Seventh Embodiment)

In a seventh embodiment, CPU 1A of the heating cooker having the configuration shown in FIGS. 1 to 4 described above determines timing when container 32 needs to be cleaned. That is, scale (mineral component, calcium carbonate and the like in tap water) is deposited on the inner wall of container 32 of steam generating apparatus 24. An increase in amount of the scale deposition causes the deposited scale to serve as a heat insulating layer, resulting in lower heating efficiency by heater 34. It is thus desired to clean container 32 to remove the scale before the heating efficiency is lowered.

Figure 18:
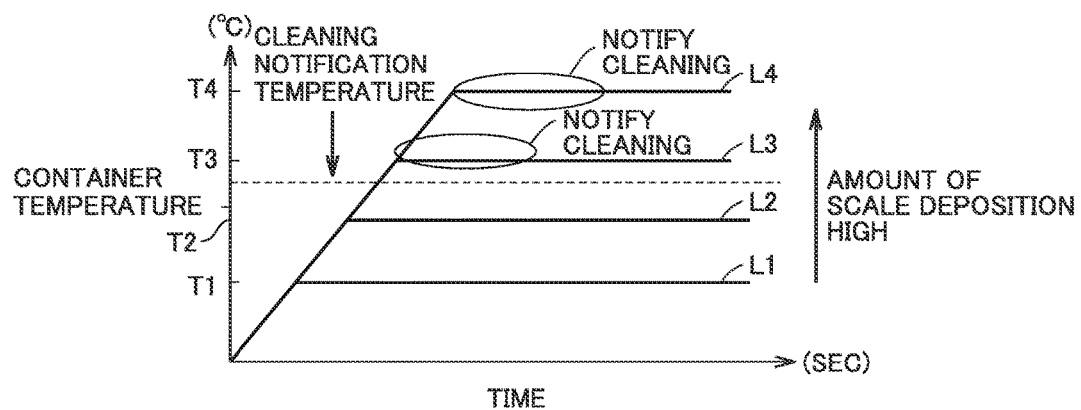
FIG. 18 is a graph referred to so as to determine cleaning timing according to a seventh embodiment of the present invention.

FIG. 18 is a graph referred to so as to determine the cleaning timing according to the seventh embodiment of the present invention. Data in this graph is acquired by experiment or the like and stored in storage unit 1B in advance. In the graph of FIG. 18, the horizontal axis represents a lapse of time, while the vertical axis represents temperature of container 32 of steam generating apparatus 24. This temperature indicates a measured temperature of container 32 based on output from in-housing temperature sensor 70.

Referring to FIG. 18, graphs L1, L2, L3 and L4 each show temperature variation until the start of boiling (start of evaporation) is detected with varying amounts of scale deposition. In FIG. 18, a relation of (L1<L2<L3<L4) is satisfied for the amount of scale deposition, while a relation of (T1<T2<T3<T4) is satisfied for the temperature at which the start of boiling is detected.

Referring to FIG. 18, a description is given of an example where the heating by heater 34 is performed in accordance with the same duty. When the amount of scale deposition is low (see graphs L1, L2 and the like), evaporation can be started from the inside of container 32 relatively early since the start of the heating (when relatively low temperatures T1, T2 are detected). When the amount of scale deposition is high (see graphs L3, L4 and the like), on the other hand, evaporation can be started from the inside of container 32 when a relatively long time has elapsed since the start of the heating (when the heating has been performed to relatively high temperatures T3, T4). In this manner, the higher the amount of scale deposition, the lower the efficiency of heating of container 32.

In the seventh embodiment, a "cleaning notification temperature" indicated by a broken line in FIG. 18 is set as a reference temperature to clean container 32. In operation, during execution of steam cooking, when "water present" described above is determined based on output from water level sensor 38, CPU 1A determines, based on output from in-housing temperature sensor 70, whether or not a temperature equal to or greater than the "cleaning notification temperature" in FIG. 18 is continuously detected for a predetermined time.

When it is determined that a temperature equal to or greater than the "cleaning notification temperature" has been continuously detected for the predetermined time, CPU 1A provides a notification of a message for prompting cleaning of container 32 upon termination of the steam cooking, or thereafter. For example, the message is displayed on colored liquid crystal display unit 10.

According to the seventh embodiment, in the steam generating apparatus including: the steam generator having the housing (container 32) capable of storing water therein, and the heating unit (heater 34) for heating the housing so as to generate steam; and the controller (CPU 1A) for controlling the steam generator, the controller is configured to estimate the amount of scale deposition based on the characteristic of temperature variation in the housing, and determine whether or not the housing needs to be cleaned based on this estimation.

In addition, the controller performs the estimation and determination described above during execution of steam cooking, and provides a notification of a message based on the determination result upon termination of the steam cooking, or thereafter.

According to the method of the seventh embodiment, therefore, even when the water used varies in hardness, it can be determined whether or not the cleaning is needed and a notification thereof can be provided from the estimation based on the temperature characteristics in FIG. 18. In addition, container 32 is cleaned in accordance with the notification, thereby avoiding a situation where the steam cooking is performed with a reduced amount of evaporation.

(Eighth Embodiment)

Figure 19:
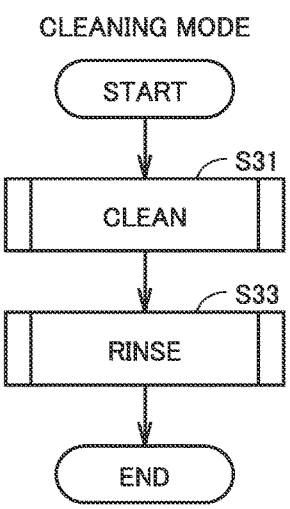
FIG. 19 is a process flowchart related to a cleaning mode of a steam generating container according to an eighth embodiment of the present invention.

FIG. 19 is a process flowchart related to a cleaning mode of a steam generating container according to an eighth embodiment of the present invention. This flowchart is stored as a program in storage unit 1B in advance. The process is implemented by CPU 1A reading the program from storage unit 1B and executing the read program.

Figure 20:
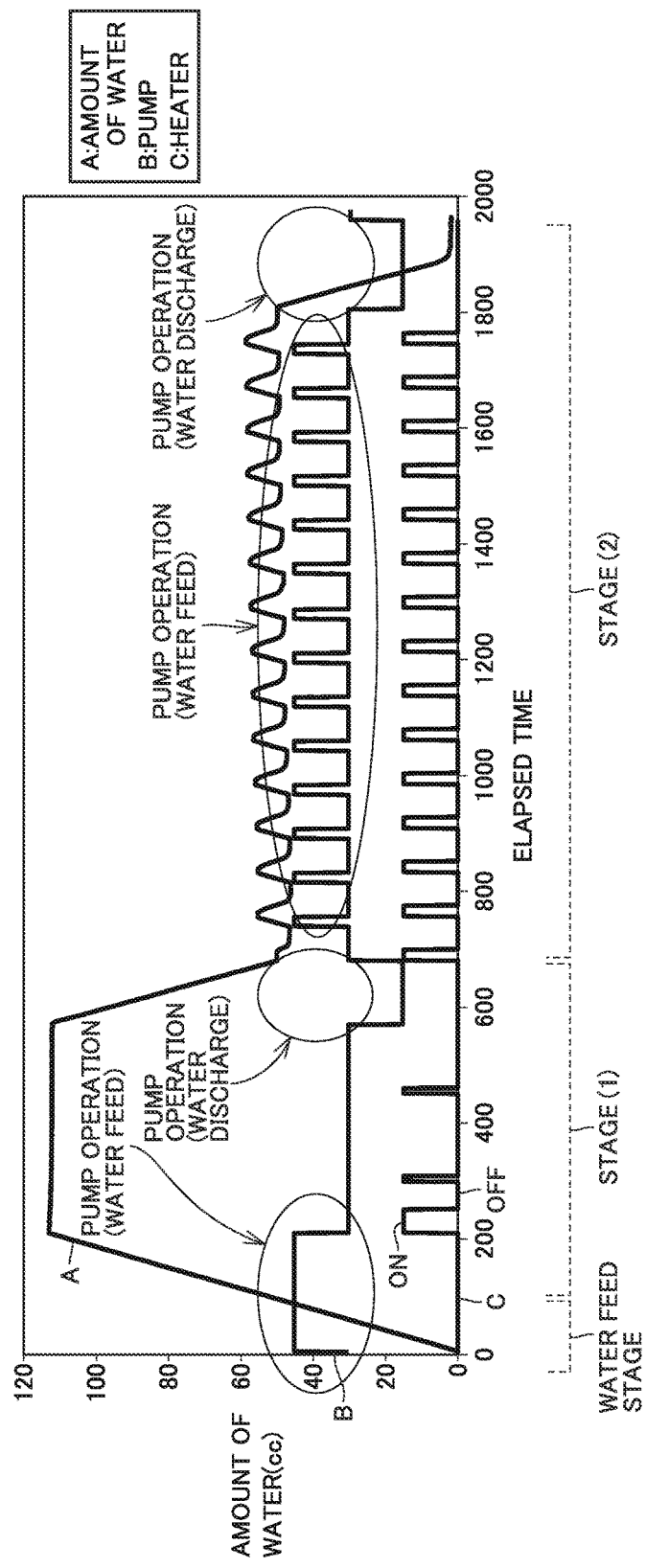
FIG. 20 is a timing chart of a cleaning step according to the eighth embodiment of the present invention.
Figure 21:
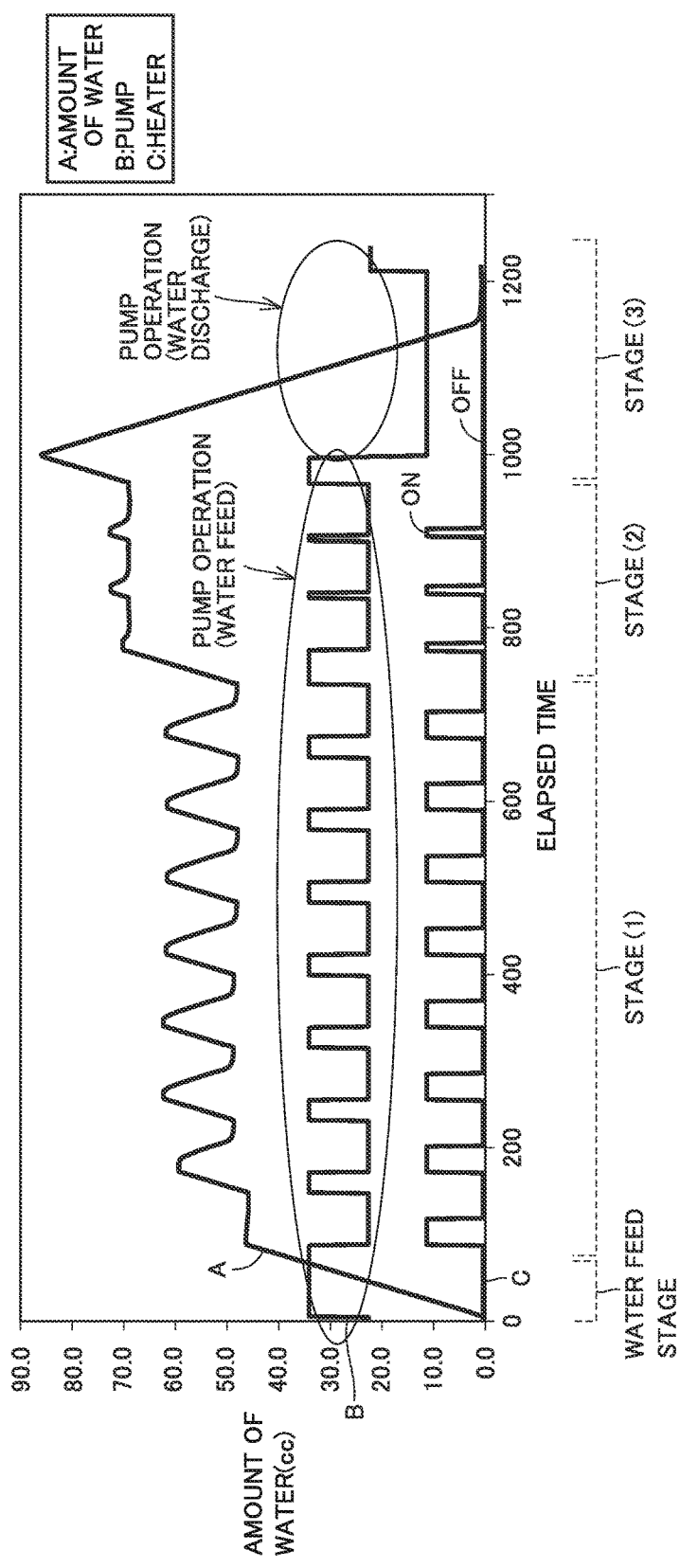
FIG. 21 is a timing chart of a rinsing step according to the eighth embodiment of the present invention.

FIG. 20 is a timing chart of a cleaning step according to the eighth embodiment of the present invention. FIG. 21 is a timing chart of a rinsing step according to the eighth embodiment of the present invention. In each of FIGS. 20 and 21, the horizontal axis represents a lapse of time, while the vertical axis represents, in relation to the lapse of time, a graph A showing variation in the amount stored water in container 32, a signal B indicating a change between ON (operated (rotating in one direction or rotating in the opposite direction)) and OFF (stopped) of tube pump 25, and a signal C indicating ON (heating) and OFF (heating stopped) of heater 34. FIGS. 20 and 21 show data obtained by experiment by the inventors.

In the eighth embodiment, when the user specifies the cleaning mode by operating operation panel 9, CPU 1A starts the process of the cleaning mode of FIG. 9 in accordance with the contents of operation. The user specifies the cleaning mode when, for example, confirming the "message for prompting cleaning of container 32" described in the seventh embodiment. In this case, the cover for closing container 32 is provided at the upper opening in container 32.

Referring to FIG. 19, when the cleaning mode is specified, CPU 1A performs a cleaning step with a cleaning solution (step S31), then performs a rinsing step (step S33). When the rinsing step ends, CPU 1A provides a notification to that effect via colored liquid crystal display unit 10 or the like. Although the "cleaning solution" as used herein refers to an aqueous solution containing citric acid dissolved therein for neutralizing the scale, the neutralizing agent is not limited thereto.

First, the cleaning step (step S31) is described with reference to the timing chart of FIG. 20. Prior to the start of the cleaning step, the entire water in container 32 has been discharged, and the user mounts feed water tank 26 containing a sufficient amount of the cleaning solution on the heating cooker.

Referring to FIG. 20, the cleaning step includes a water feed STAGE step, a subsequent STAGE (1) step, and a subsequent STAGE (2) step.

In the initial water feed STAGE step, CPU 1A stops heater 34, and controls tube pump 25 to rotate in one direction. Accordingly, the cleaning solution is fed from feed water tank 26 into container 32 while the heating of container 32 is stopped. After the start of the water feed, when "water present" is determined based on output from water level sensor 38, CPU 1A ends the water feed STAGE step and moves to the STAGE (1) step. Accordingly, the cleaning solution is supplied into container 32 to the water level of threshold value TH described above.

The STAGE (1) step is a step in which the cleaning solution in container 32 is maintained without being boiled. First, CPU 1A controls tube pump 25 to rotate in one direction so as to additionally feed a predetermined amount of water. Here, since tube pump 25 is set to have a constant rotation speed, CPU 1A acquires the amount of water supplied to container 32 based on the length of rotation time of tube pump 25. When it is determined that the predetermined amount of water has been additionally fed to container 32 based on the acquired amount of supplied water, CPU 1A stops tube pump 25. Then, CPU 1A performs heating by heater 34. For example, ON/OFF control of heater 34 is intermittently performed to perform heating of container 32.

CPU 1A performs ON/OFF control of heater 34 based on output from in-housing temperature sensor 70, in accordance with a duty predetermined such that the temperature of the cleaning solution in container 32 is maintained at a predetermined temperature at which the cleaning solution does not boil. The temperature of the cleaning solution in container 32 can be thus maintained. This temperature for temperature maintenance is desirably a temperature for facilitating softening of the scale deposited on the inner wall of container 32, and facilitating the neutralizing effect of the citric acid.

After the above temperature-maintained state has been continued for a predetermined time, CPU 1A turns heater 34 off so as to stop the heating of container 32. CPU 1A also rotates tube pump 25 in the opposite direction. The cleaning solution in container 32 is thus discharged into feed water tank 26. CPU 1A acquires an amount of the discharged water based on the length of rotation time of tube pump 25.

When it is determined that the acquired amount of discharged water has reached a predetermined amount, CPU 1A stops tube pump 25 so as to stop the water discharge. This water discharge causes the water level in container 32 to be lowered to a water level at which bumping of the solution does not occur even if the solution is boiled, and the STAGE (1) step ends.

Then, the STAGE (2) step is performed. CPU 1A performs ON/OFF control of heater 34 in accordance with a predetermined duty, to raise the temperature of the cleaning solution in container 32 to a temperature at which the cleaning solution is boiled, based on output from in-housing temperature sensor 70. In addition, at this time, CPU 1A intermittently rotates tube pump 25 in one direction, to repeat a process of intermittently adding the cleaning solution from feed water tank 26 into container 32. It is to be noted that an amount of the cleaning solution added each time is an amount of water for supplementing an amount of evaporated solution caused by the boiling. Accordingly, for the cleaning solution in container 32, vibration (convection) occurs by the boiling and the addition of the cleaning solution, which facilitates exfoliation of the scale deposited on the inner wall of container 32.

When it is determined that a predetermined time has elapsed since the start of the STAGE (2) step, CPU 1A performs OFF control of heater 34 to stop the heating. CPU 1A also rotates tube pump 25 in the opposite direction, to discharge the water from container 32 into feed water tank 26. When the discharge of water in container 32 is completed, the STAGE (2) step ends.

When the cleaning step shown in FIG. 20 ends, CPU 1A provides a notification indicating the end of the cleaning step. For example, a message "cleaning step complete" is displayed on colored liquid crystal display unit 10. Upon confirming this message, the user removes feed water tank 26, and discards the cleaning solution in feed water tank 26 (cleaning solution after container 32 has been cleaned in the cleaning step). Then, after filling feed water tank 26 with a sufficient amount of water (for example, tap water) for the subsequent rinsing step, the user mounts feed water tank 26 on the heating cooker.

When it is detected that feed water tank 26 has been mounted based on output from the hardware switch described above, CPU 1A starts the rinsing step of FIG. 21 (see step S33 of FIG. 19).

Referring to FIG. 21, the rinsing step includes a water feed STAGE step, a subsequent STAGE (1) step, a subsequent STAGE (2) step, and a subsequent STAGE (3) step.

In the initial water feed STAGE step, CPU 1A stops heater 34, and controls tube pump 25 to rotate in one direction. Accordingly, water feed is performed from feed water tank 26 into container 32 while the heating of container 32 is stopped. After the start of the water feed, when "water present" is determined based on output from water level sensor 38, CPU 1A ends the water feed STAGE step and moves to the STAGE (1) step. Accordingly, the water is stored in container 32 at the water level of threshold value TH described above.

The STAGE (1) step is a step in which the water in container 32 is boiled at a water level at which bumping does not occur, to rinse the inside of container 32. First, CPU 1A intermittently rotates tube pump 25 in one direction to additionally feed a predetermined amount of water with each rotation, while intermittently performing ON/OFF control of heater 34 in accordance with a duty having a relatively long ON time, to perform heating of container 32. When a predetermined time has elapsed since the start of the STAGE (1) step, the STAGE (1) step ends.

In this manner, in the STAGE (1) step, the heating operation is performed in accordance with the duty at the water level at which bumping does not occur, causing vibration of the water surface in container 32. As a result, the scale and the citric acid remaining in container 32 are rinsed. In this case, because of the setting of the duty having a relatively long ON time, the rinsing of the inside of container 32 is mainly facilitated.

In the subsequent STAGE (2) step, CPU 1A rotates tube pump 25 in one direction to additionally feed a predetermined amount of water into container 32. The amount of additionally fed water is an amount for making the water surface substantially level with the upper opening surface of container 32. After such additional water feed is performed, CPU 1A sets the duty such that the ON time is shortened, and controls heater 34 in accordance with the duty after the setting. Accordingly, heating of container 32 by heater 34 is performed in accordance with the duty that prevents bumping, causing vibration of the water surface at the opening surface of container 32. With this vibration, the scale deposited on the cover in the cleaning step and the citric acid can be rinsed effectively.

Then, the STAGE (3) step is performed. In the STAGE (3) step, CPU 1A rotates tube pump 25 in one direction so as to increase the water level in container 32 to a water level exceeding the cover. The scale and the citric acid remaining above the cover can be thus rinsed. After a lapse of a predetermined time, CPU 1A controls tube pump 25 to rotate in the other direction, to discharge the entire water in container 32 into feed water tank 26. The rinsing step thus ends. The rinsing step may be repeated a plurality of times. When the rinsing step ends, CPU 1A provides a notification indicating the end of the cleaning mode. For example, a message "cleaning mode complete" is displayed on colored liquid crystal display unit 10. Upon confirming this message, the user removes feed water tank 26, and discards the water in feed water tank 26 (water after container 32 has been rinsed in the rinsing step).

In the eighth embodiment, in the cleaning step of FIG. 20, first, the cleaning solution contained in feed water tank 26 is fed into container 32 (water feed STAGE step). Then, the step at which the temperature is maintained at a first water level higher than during the normal operation (threshold value TH) at a temperature that does not cause boiling for a prescribed time (STAGE (1) step) and the second step are performed. In the second step, the cleaning solution in container 32 is discharged until the water level of the cleaning solution varies to a second water level, and then the cleaning solution corresponding to the amount of evaporated solution is supplied into container 32 after heating and boiling at a prescribed time ratio (duty), whereby the water level is maintained. Then, the cleaning solution in container 32 is discharged.

In the rinsing step, as shown in FIG. 21, the normal water (for example, tap water) in feed water tank 26 is supplied into container 32 (water feed STAGE step). Then, for each of the plurality of water levels, control of the heating by heater 34 is performed at a prescribed time ratio (duty), whereby the boiling step is repeated (STAGE (1) step, STAGE (2) step). Then, the step for discharging the water in container 32 after the rinsing (STAGE (3) step) is performed.

According to the eighth embodiment, in the steam generating apparatus including: the steam generator having the housing (container 32) capable of storing water therein, and the heating unit (heater 34) for heating the housing so as to generate steam; the water feed/discharge unit (tube pump 25) for feeding/discharging water into/from the housing; the tank (feed water tank 26) for containing water therein; and the controller (CPU 1A) for controlling each unit, the controller is configured to perform, in the cleaning mode of cleaning the housing, the steps of: supplying the cleaning solution in the tank into the housing to the first water level through the water feed/discharge unit; maintaining the temperature of the cleaning solution in the housing by the heating unit; discharging the cleaning solution in the housing through the water feed/discharge unit such that the water level of the cleaning solution varies from the first water level to the second water level; causing the cleaning solution in the housing to boil by the heating unit; and discharging the cleaning solution in the housing.

The controller is configured to perform, in the rinsing mode for rinsing the inside of the housing (container 32), the steps of: supplying the water in the tank (feed water tank 26) into the housing through the water feed/discharge unit (tube pump 25); repeatedly causing the water in the housing to boil by the heating unit; and discharging the water in the housing.

The controller is configured to perform the rinsing mode after the cleaning mode described above. The rinsing mode is performed a plurality of times.

According to the eighth embodiment, in the cleaning mode, the cleaning step and the rinsing step are performed while the water (or cleaning solution) in container 32 is heated at a temperature at which bumping does not occur, so that cleaning for removing the scale in container 32 can be performed without causing the cleaning solution or water to splash to the other units.

It is to be noted that the heating cooker may be configured to include one of the embodiments described above, or may be configured to include two or more of the embodiments.

According to each of the embodiments described above, the heating cooker capable of performing control of steam generation operation depending on the amount of water in the steam generator as well as having excellent usability can be obtained.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

2A counter controller; 2B feed water controller; 2C heating controller; 3A pump counter; 3B heater counter; 9 operation panel; 24 steam generating apparatus; 25 tube pump; 26 feed water tank; 34 heater for steam generation; 38 water level sensor; 39A, 39B electrode bar; 70 in-housing temperature sensor; 100 control device.

What is claimed is:

1. A steam generating apparatus comprising:
    a steam generator, the steam generator including a housing capable of storing water therein, and a heating unit for heating the housing so as to generate steam;
    a water level measurement unit for measuring a water level in the housing;
    a water supply unit for supplying water into the housing; and
    a controller for controlling the heating unit and the water supply unit,
    the controller being configured to
    when a time during which that the measured water level does not exceed a threshold value continues for a first time, control the water supply unit to start water supply into the housing, and
    when the time during which the measured water level does not exceed the threshold value continues for a second time longer than the first time, control the heating unit to stop heating of the housing;
    wherein the controller is further configured to
    when the measured water level exceeds the threshold value, and thereafter, when a time during which the measured water level exceeds the threshold value continues for a third time, control the heating unit to start heating of the housing, and
    when the time during which the measured water level exceeds the threshold value continues for a fourth time longer than the third time, control the water supply unit to stop the water supply into the housing.

2. The steam generating apparatus according to claim 1, wherein
    a length of the second time represents a length of time required for the level of water stored in the housing to vary from the threshold value to a predetermined residual water level by evaporation.

3. The steam generating apparatus according to claim 1, further comprising a temperature measurement unit for measuring temperature in the housing, wherein
    the steam generating apparatus varies a length of time of the water supply by the water supply unit based on the temperature measured by the temperature measurement unit.

4. The steam generating apparatus according to claim 3, wherein
    the length of time of the water supply when the measured temperature is equal to or greater than a predetermined temperature is longer than the length of time of the water supply when the measured temperature is less than the predetermined temperature.

5. The steam generating apparatus according to claim 1, further comprising a water tank for containing water therein, wherein
    the water supply unit includes a pump for flowing water between the water tank and the inside of the housing, and
    the controller is configured to, when controlling the pump to continue supply operation of delivering the water in the water tank into the housing for a predetermined supply time since start of the water supply into the housing, or when controlling the pump to continue the supply operation for a predetermined time since stop of the heating by the heating unit, and when the measured water level does not exceed the threshold value, determine that there is no water in the water tank.

6. The steam generating apparatus according to claim 5, wherein
    the controller controls the pump to deliver the water in the housing to the water tank.

* * * * *